United States Patent
Lee et al.

(10) Patent No.: US 10,305,580 B1
(45) Date of Patent: May 28, 2019

(54) SYSTEMS AND METHODS FOR FREQUENCY REUSE FOR MULTI-BEAM SATELLITE DOWNLINKS

(71) Applicant: Hughes Network Systems, LLC, Germantown, MD (US)

(72) Inventors: Lin-Nan Lee, Germantown, MD (US); Udaya Bhaskar, Germantown, MD (US); Stanley Kay, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 15/890,289

(22) Filed: Feb. 6, 2018

(51) Int. Cl.
| | | |
|---|---|---|
| *H04B 7/185* | (2006.01) | |
| *H04B 7/0452* | (2017.01) | |
| *H04B 7/06* | (2006.01) | |
| *H04B 7/212* | (2006.01) | |
| *H04B 7/204* | (2006.01) | |

(52) U.S. Cl.
CPC ....... *H04B 7/18513* (2013.01); *H04B 7/0452* (2013.01); *H04B 7/0617* (2013.01); *H04B 7/0626* (2013.01); *H04B 7/18532* (2013.01); *H04B 7/2041* (2013.01); *H04B 7/2125* (2013.01)

(58) Field of Classification Search
CPC .................. H04B 7/18513; H04B 7/0617; H04B 7/2041; H04B 7/18532; H04B 7/0452; H04B 7/0626; H04B 7/2125
See application file for complete search history.

(56) References Cited

U.S. PATENT DOCUMENTS

| | | | | |
|---|---|---|---|---|
| 2009/0296663 | A1* | 12/2009 | Wild | H01Q 1/246 370/335 |
| 2011/0032849 | A1* | 2/2011 | Yeung | H04B 7/0434 370/280 |
| 2012/0314570 | A1* | 12/2012 | Forenza | H04B 7/024 370/230 |

\* cited by examiner

*Primary Examiner* — Chuong A Ngo
(74) *Attorney, Agent, or Firm* — Sheppard Mullin Richter & Hampton LLP; Daniel N. Yannuzzi

(57) ABSTRACT

Signal precoding can include: determining a first antenna pattern gain for a beam directed from a first antenna feed on the satellite toward a first user terminal in a first cell and determining a second antenna pattern gain for a beam directed from a second antenna feed on the satellite toward a second user terminal in a second cell adjacent to the first cell; wherein the adjacent cells are partitioned into sectors; determining a first sector location of the first user terminal and a second sector location of the second user terminal; a precoder matrix circuit using the determined first and second antenna pattern gains to calculate a precoder matrix to reduce interference levels caused by the first signal at the second sector and by the second signal at the first sector; and the precoder matrix circuit applying the precoder matrix to the first and second signals.

30 Claims, 21 Drawing Sheets

SYSTEMS AND METHODS FOR FREQUENCY REUSE FOR MULTI-BEAM SATELLITE DOWNLINKS

TECHNICAL FIELD

The disclosed technology relates generally to satellite communications, and more particularly, some embodiments relate to techniques for improving reuse efficiency for multi-beam satellite downlinks.

DESCRIPTION OF THE RELATED ART

High-capacity multi-beam satellite communication systems typically divide the coverage area into a plurality of contiguous spot beams. The use of multiple beams can provide for a very large coverage area. However, bandwidth limitations typically require that the same bandwidth be allocated to multiple beams. This is referred to as frequency reuse. To reduce the likelihood of interference, the available bandwidth is divided into frequencies and the same frequencies are allocated to spatially isolated beams.

Conventional antenna far field patterns and frequency reuse plans are routinely used by multi-beam satellite systems to provide discrimination between nearby signals from other beams. Typical frequency reuse patterns may include reuse 4 or reuse 3, resulting in each beam with ¼ or ⅓, respectively, of the total frequency and polarization resource available for satellite downlinks. FIG. 1 illustrates an example of four-color and two-color reuse. In the case of four-color reuse 104 (K=4), the frequencies are divided into four groups (illustrated as A, B, C and D in this example). As this illustrates, each group is assigned such that, for a given beam, each of its immediately adjacent beams is at a different frequency from the frequency for the given beam. Consider an example in the Ku-band in which the total bandwidth available may be 500-1000 MHz, and there may be two polarizations. Accordingly, four-color reuse yields 250-500 MHz per spot beam.

System throughput can be increased by using a more aggressive reuse factor of K=2, in which case the symbol rate is increased by 1.5× (vs K=3) or 2× (vs K=4). However, the higher symbol rate may not result in higher throughput since UTs (User Terminals) near cell edges receive high levels of interference from adjacent co-channel cells. This results in sometimes severe degradation in throughput for UTs at the cell edges.

Conventional solutions attempt to solve a general problem involving multi-gateway and multi-beam satellite systems, resulting in excessively complex precoder solutions. Some solutions have proposed using DVB-S2/X superframes to align transmission to the adjacent beams so the precoding coefficient changes can be made at the superframe boundary to ease implementation complexity.

SUMMARY

Embodiments of the systems and methods disclosed herein provide techniques for improving frequency reuse efficiency for multi-beam satellite downlinks through the use of signal precoding.

A process for signal precoding in a frequency-reuse satellite communication system including a plurality of beams transmitting from a satellite to a plurality of cells, the process including: determining a first antenna pattern gain for a beam directed from a first antenna feed on the satellite toward a first user terminal in a first cell and determining a second antenna pattern gain for a beam directed from a second antenna feed on the satellite toward a second user terminal in a second cell adjacent to the first cell; wherein the first and second adjacent cells are partitioned into a plurality of sectors; determining a first sector location of the first user terminal in the first cell and a second sector location of the second user terminal in the second cell; a precoder matrix circuit using the determined first and second antenna pattern gains to calculate a precoder matrix to reduce interference levels caused by the first signal at the second sector of the second cell and by the second signal at the first sector of the first cell; and the precoder matrix circuit applying the precoder matrix to the first and second signals to at least partially cancel interference caused by the first signal at the second sector and to at least partially cancel interference caused by the second signal at the first sector.

In various embodiments, the precoder matrix may be calculated using the first and second antenna pattern gains for the first and second sector locations, independent of the location of first and second user terminals within their respective first and second sectors.

Calculating a precoder matrix may include precomputing a set of precoder matrices for all possible combinations of sectors in adjacent halves of the adjacent cells, and selecting the precoder matrix corresponding to the first and second sectors from the precomputed set of precoder matrices. The sector location for a given sector may be a geographic center of that sector or it may be the location of the centroid of the distribution of user terminals within that sector or the location that results in beam shapes that result in the highest average throughput for the user terminals in the sector.

The process may also include the satellite transmitting the first and second signals from the first and second antenna feeds, respectively, via a user downlink to the first and second user terminals, and the first user terminal receives a sum of the first signal and the second signal.

In some embodiments, the first and second adjacent cells may be further partitioned into half cells, the process further including: determining a destination half-cell of a packet of the first signal; if the packet of the first signal may be destined for the first half-cell of the first cell, transmitting the first packet; if the packet of the first signal may be destined for the second half-cell of the first cell, determining a distance between the destination sector of the packet in the first signal and the destination sector of the packet in the second signal, and if the determined distance may be greater than a determined threshold, transmitting the packet, but if the determined distance may be not greater than the determined threshold, not transmitting the packet of the first signal. If the determined distance is not greater than the determined threshold, this can be repeated for another packet of the first signal.

In some embodiments, applications may include controlling transmissions between the beam transmitting the first signal and the beam transmitting the second signal such that if one of the beams may be transmitting to a sector on the edge of its corresponding cell, the other beam may be only permitted to transmit to an interior sector of its corresponding cell.

Embodiments may also include selecting a candidate packet from all cells in the pattern to create a vector of destination sectors that may be used for a group of packets; calculating a distance between a sector of the candidate packet and a sector of a packet for a beam of an adjacent cell; determining whether the calculated distance may be greater than a predetermined minimum distance between the destination sectors and if so, tagging the candidate packet for transmission; and repeating the selecting, calculating and distance determining operations for cell pairs in the plurality of sectors.

The first and second adjacent cells may be partitioned into first and second half-cells, and further partitioned into a plurality of sectors, and the process may further include scheduling transmissions of the first and second signals such that the first and second signals are transmitted to first and second sectors, respectively, having a predetermined minimum separation distance.

Each cell may be partitioned into any of a number of sectors. For instance, in the example of FIG. 12 (described in detail below), the cells are partitioned into six sectors. The scheduling of transmissions may include allowing the second signals to be transmitted to sectors in one half of the second cell when the first signals are being transmitted to sectors in an adjacent half of the second cell according to the following constraint:

|  |  | IF FIRST SIGNALS ARE BEING TRANSMITTED TO: | | |
|---|---|---|---|---|
|  |  | 4 | 5 | 6 |
| SECOND SIGNALS CAN BE TRANSMITTED TO: | 1 | YES | NO | NO |
|  | 2 | YES | YES | NO |
|  | 3 | YES | YES | YES |

In another example, a cell is partitioned into twelve sectors and the scheduling of transmissions may include allowing the second signals to be transmitted to sectors in one half of the second cell when the first signals are being transmitted to sectors in an adjacent half of the second cell according to the following constraint:

|  |  | IF FIRST SIGNALS ARE BEING TRANSMITTED TO: | | | | | |
|---|---|---|---|---|---|---|---|
|  |  | 7 | 8 | 9 | 10 | 11 | 12 |
| SECOND SIGNALS CAN BE TRANSMITTED TO: | 1 | YES | YES | NO | NO | NO | NO |
|  | 2 | YES | YES | YES | NO | NO | NO |
|  | 3 | YES | YES | YES | YES | NO | NO |
|  | 4 | YES | YES | YES | YES | YES | NO |
|  | 5 | YES | YES | YES | YES | YES | YES |
|  | 6 | YES | YES | YES | YES | YES | YES |

Determining and applying the precoder matrix are performed by a satellite gateway or by the satellite. The process can include correcting for differential phase or amplitude errors due to a feeder uplink or satellite transponder using a calibration process to factor out the errors. In some applications, the satellite communication system may include an antenna with a single feed per beam (SFPB) for user links and wherein a number of adjacent mutually interfering cells are served from the same gateway. In such applications, the precoder matrix circuit operations may be performed by the gateway.

In yet another embodiment, a system for implementing frequency-reuse in a satellite communication system, includes: a communication gateway including inputs coupled to receive user streams; a satellite communicatively coupled to the gateway, the satellite including a plurality of feeds, wherein a first feed transmits a first signal in a first beam to a first user terminal in a first sector of a first cell, and a second feed transmits a second user signal in a second beam to a second user terminal in a second sector in a second cell adjacent the first cell; and a precoder circuit, including a plurality of input receiver circuits coupled to receive user data streams including first and second user signals; and a precoder computation circuit coupled to receive the first and second user signals and including a processor to determine a first sector location of the first user terminal in the first cell and a second sector location of the second user terminal in the second cell, and to compute a precoder matrix that when applied to at least one of the first and second user signals reduces interference caused by the second signal at the first user terminal, wherein the precoder computation circuit computes the precoder matrix using antenna pattern gains for the first and second beams relative to respective sector locations of the first and second sectors.

In some embodiments, the precoder computation circuit computes the precoder matrix using the antenna pattern gains for the first and second sector locations, independent of the location of first and second user terminals within their respective first and second sectors. Computing a precoder matrix may include precomputing a set of precoder matrices for all possible combinations of sectors in adjacent halves of the adjacent cells, and selecting the precoder matrix corresponding to the first and second sectors from the precomputed set of precoder matrices.

A sector location for a given sector may be a geographic center of that sector. In other embodiments, a sector location for a given sector may be the location of the centroid of the distribution of user terminals within that sector or the location that results in beam shapes that result in the highest average throughput for the user terminals in the sector.

The first and second adjacent cells may be partitioned into first and second half-cells, a destination of a packet of the first signal may be a sector in the first cell, and a destination of a packet in the second signal may be a sector in the second cell, and wherein the system may further include a scheduling circuit including a processor and instructions stored in non-transitive memory, the instructions configured to perform the operations of determining a destination half-cell of a the packet of the first signal; if the packet of the first signal may be destined for the first half-cell of the first cell, transmitting the first packet; if the packet of the first signal may be destined for the second half-cell of the first cell, determining a distance between the destination sector of the packet in the first signal and the destination sector of the packet in the second signal, and if the determined distance may be greater than a determined threshold, transmitting the packet, but if the determined distance may be not greater than the determined threshold, not transmitting the packet of the first signal. The instructions may further be configured to perform the operation of: if the determined distance may be not greater than the determined threshold, repeating the operations for another packet of the first signal.

The instructions may further be configured to perform the operation of controlling transmissions between the beam transmitting the first signal and the beam transmitting the second signal such that if one of the beams may be transmitting to a sector on the edge of its corresponding cell, the other beam may be only permitted to transmit to and interior sector of its corresponding cell.

In various embodiments, a coverage area of the satellite may include a plurality of cells arranged in a pattern and the cells are each divided into a plurality of sectors, and wherein the instructions are further configured to perform the operations of: selecting a candidate packet from all cells in the pattern to create a vector of sectors that may be used in a superframe; calculating a distance between a sector of the candidate packet and a sector of a packet for a beam of an adjacent cell; determining whether the calculated distance may be greater than a predetermined minimum distance between the destination sectors and if so, tagging the candidate packet for transmission; and repeating the selecting, calculating and distance determining operations for cell pairs in the plurality of sectors. The first and second adjacent cells may be partitioned into first and second half-cells, the adjacent cells may further be partitioned into a plurality of sectors, and wherein the instructions may further be configured to perform the operation of scheduling transmissions of the first and second signals such that the first and second signals are transmitted to first and second sectors, respectively, having a predetermined minimum separation distance.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
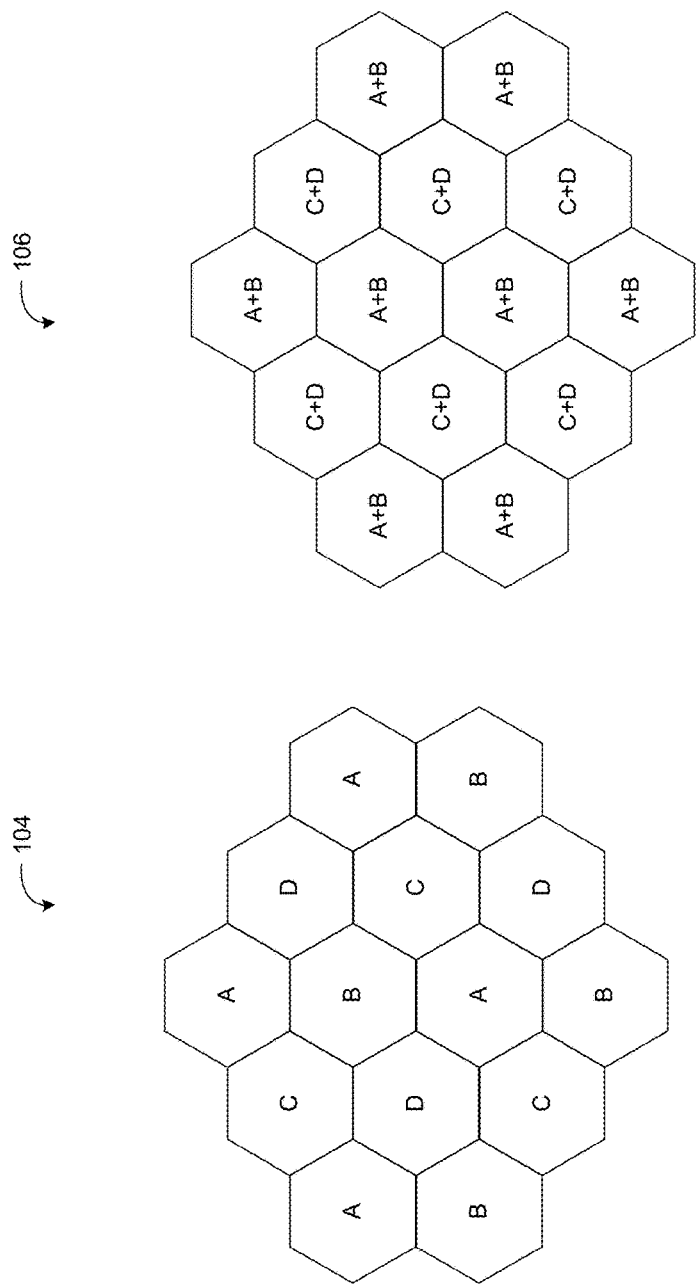
FIG. 1 illustrates an example of four-color and two-color reuse.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF EMBODIMENTS

Embodiments of the systems and methods disclosed herein describe a linear precoding technique that exploits the knowledge of antenna far field patterns used on a typical multi-beam satellite system to improve the frequency reuse efficiency on the outroute and thereby increase the outroute capacity of a multi-beam satellite system.

In some embodiments, a precoding scheme may be implemented to allow reuse (for example, reuse 2) among the adjacent beams by inserting a properly phased replica of the signal into the adjacent beams' signals. This may take advantage of a common location for jointly processing these adjacent beam signals, such as would occur for signals originating from the same gateway. In other embodiments, the satellite may provide a beamforming capability, in which case the signals for adjacent cochannel beams might originate from any gateway (GW). As a result, each beam can use ½ of the total frequency and polarization resource available. For example, one GW might serve all the cells for a frequency pair in a single column. This can also be thought of as reuse 1 in alternate columns. (Typically, this is realized by allocating all the frequency for one polarization to each beam.) The satellite downlink capacity can therefore be increased.

In some embodiments, the co-channel signals are jointly processed prior to transmission on the out route so that interference can be canceled. This can be accomplished to pre-correct the desired signal to each cell to account for the signals providing interference into that cell. In the case of a bent pipe satellite, co-channel signals to a group of cells are generally available at the Gateway. Accordingly, embodiments can be implemented such that the Gateway performs the precoding to mitigate the interference between the group of cells that it serves, assuming there are cells that are adjacent to one another. In some embodiments, precoding can be viewed as a form of beamforming accomplished by combining secondary responses of the antenna feeds.

In various embodiments, the cells are divided into sectors and the precoder matrix may be computed based on antenna beam patterns relative to the various sector locations (e.g., based on sector centers). The precomputed matrix for each sector can be used for all UTs (User Terminals) within a given sector. Accordingly, the precoding can be accomplished on a sector basis, independently of actual UT locations within the sector, and instead dependent on only a finite number of sector locations.

For a typical multi-beam satellite, the main lobe of the antenna pattern is called the beam and the coverage area on the surface that is illuminated by the beam is called the cell. The beam is a physical property of the antenna radiation pattern and the cell is a logical construct on the surface. The desired signal to interference ratio at the edge of the cell determines how close cells using the same frequency and polarization can be placed. For a one-color reuse all the cells are allocated the same frequency and polarization. In this case UTs at the edge of the cell for closely packed cells would typically experience a high level of interference. Generally multi-beam satellite systems avoid using the same frequency and polarization in adjacent neighboring cells and higher order reuse schemes are employed.

An exception occurs when the multiuser access method is code division multiple access, which is designed to operate in high co-channel interference environments. That access method uses spectral spreading to manage interference, in contrast to precoding.

Figure 2:
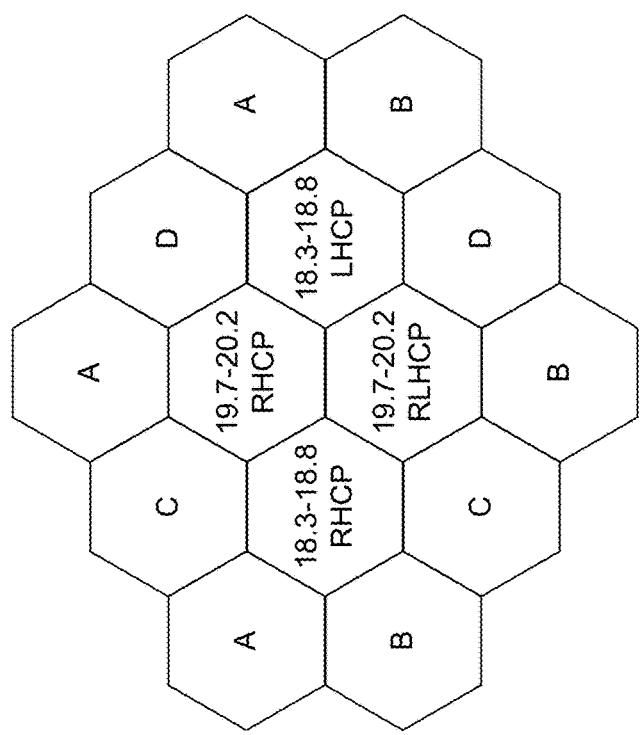
FIG. 2 illustrates a scheme combining the polarization and frequency to create 4-color reuse.

Multi-beam satellite systems often use polarization diversity in addition to frequency diversity when allocating frequency spectrum to cells. The interference between any two orthogonal polarizations is generally low. FIG. 2 illustrates a scheme combining the polarization and frequency to create 4-color reuse. Similarly, a 3-color or 7-color reuse pattern with both polarizations could also be used. In fact it is possible to lay down a desired coverage area consisting of many cells using N-color reuse where N is any positive natural number. When polarization diversity is used, N is most conveniently an even number. In the example illustrated in FIG. 2, the four colors are 18.3 to 18.8 GHz right hand circularly polarized (RHCP), 18.3-18.8 GHz left hand circularly polarized (LHCP), 19.7 to 20.2 GHz RHCP, and 19.7 to 20.2 GHz LHCP.

These bands are allocated to the geostationary FSS on a primary basis in the United States, as an example. Allocations vary elsewhere and may differ in the future. The various embodiments disclosed herein can be implemented without dependence on the particular bands or allocations, and should apply for any case in which a multi-beam satellite is used. A table of example frequency allocations can be found at 47 C.F.R. § 2.106.

Embodiments of the systems and methods disclosed herein may be implemented to achieve improved reuse by implementing precoding techniques to reduce the effects of adjacent signal interference at or near cell boundaries. Through the use of these precoding techniques, embodiments may be implemented such that each beam is able to use the entire frequency band on one polarization all the time, thereby potentially increasing the frequency reuse efficiency relative to a standard 4-color or 3-color reuse scheme. Because of hardware complexity and other limitations, the actual increase in capacity of the satellite system may depend on the implementation and cell configuration. For example, one embodiment provides a 2-color reuse scheme with the same antenna beam response and cell laydown when the traffic to these cells originate from the same gateway or through the use of satellite on-board beamforming.

Figure 3:
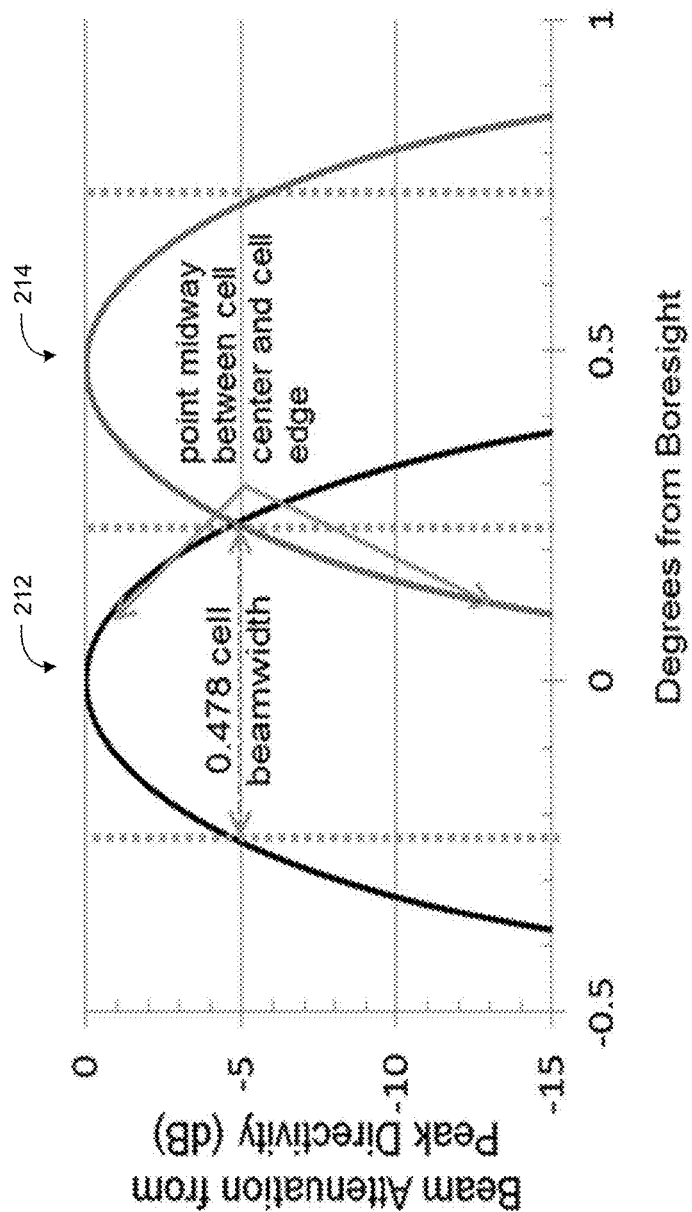
FIG. 3 shows an example of antenna far field pattern directivity for two adjacent beams from a parabolic reflector antenna of diameter 2.6 m, at a frequency of 18 GHz, pointed at two cells spaced 0.478 degrees apart.

Various embodiments described herein provide a precoding scheme that utilizes knowledge of antenna beam patterns to pre-cancel the anticipated interference to the intended receiver from a dominant interfering beam (which is usually one of the nearest beams). This pre-cancellation of anticipated interference may be implemented to increase the downlink capacity of a multi-beam communications satellite system. FIG. 3 shows an example of antenna far field pattern directivity for two adjacent beams 212, 214 from a parabolic reflector antenna of diameter 2.6 m, at a frequency of 18 GHz, pointed at two cells spaced 0.478 degrees apart. At the intersection of the two beams, or on the beam edge, the directivity of the two beams 212, 214 is the same. If the signals on both beams 212, 214 are transmitted at the same power level, a receiver on the beam edge receives each signal with equal power. In this example, the directivity at the edge of the beam is 4.8 dB below the peak directivity at the beam center. This value is typical for a multi-beam satellite system operating with a 3 or 4 color reuse pattern. Other values may be optimal for a system operating with reuse 2.

The normalized directivity of the mainlobe from a parabolic reflector antenna can be approximated by, $$2J_1(k\,a\,\sin(\theta))/(k\,a\,\sin(\theta)),$$

where $J_1$ is the Bessel function of the first kind, $$k = \frac{2\pi}{\lambda},$$

with $\lambda$=wavelength, a=aperture radius and $\theta$=angle measured from the boresight of the antenna main beam.

Based on this, the directivity of the adjacent beam has dropped by 12.9 dB from its peak at the midpoint between the cell edge and cell center, whereas the directivity of the beam has only dropped by 1.1 dB. In other words, the signal-to-interference ratio from the adjacent cell at this point is 11.8 dB. This example illustrates that the signal to interference ratio is very much dependent on the location of the intended receiver, and can be estimated if both the receiver location and antenna beam pattern are known.

However, if this same frequency is used in both adjacent cells, the two signals in each beam will interfere with each other near the cell boundary. If these signals are transmitted at equal power level, then the signal to interference ratio will be 0 dB at the boundary. Because there are contributions from other beams as well as thermal noise, even where the adjacent signals are transmitted at equal power levels, the signal to noise and interference ratio (C/(N+I)) will be negative. Accordingly, embodiments may be implemented to use one or both of precoding that is based on an anticipated interference at the receiver, and opportunistic time domain scheduling to avoid dominating interference.

In a typical reuse 2 scenario, a given beam will have two nearest interfering beams. Each interfering beam generally only affects signals transmitting to the nearest half of the cell. Thus, these can be treated separately and addressed as a pair-wise mutual interference as described below.

Figure 4:
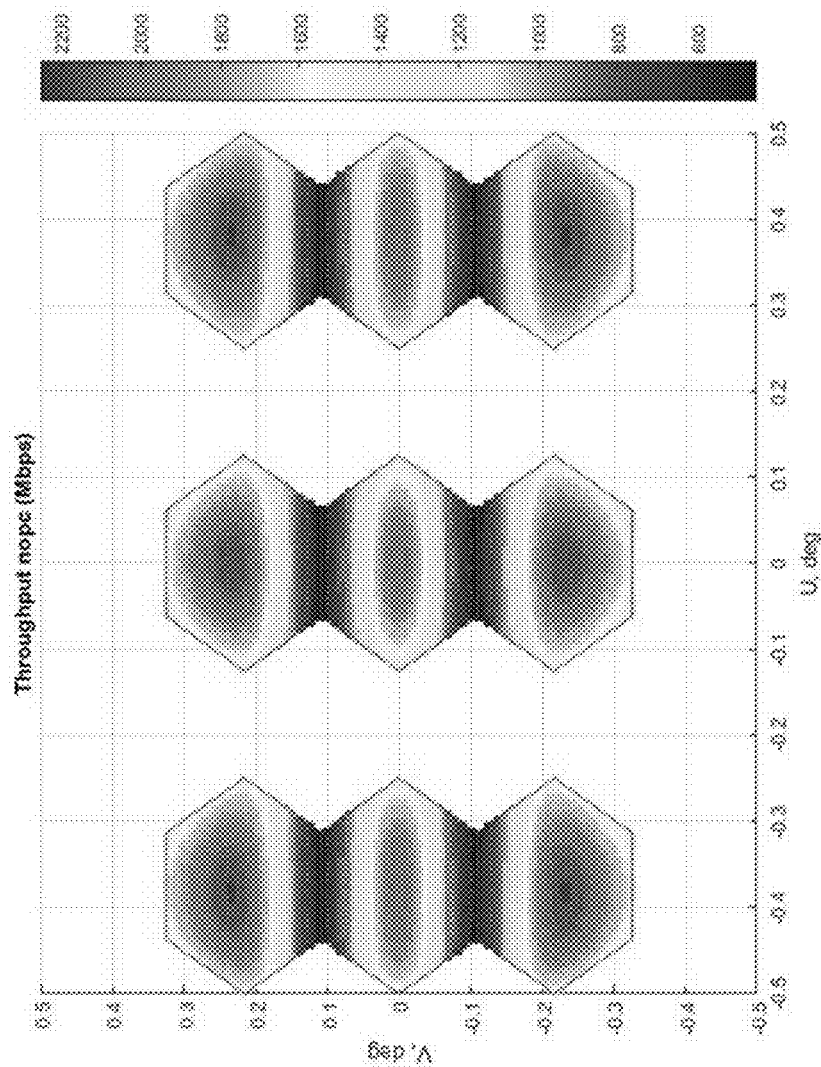
FIG. 4 illustrates the information throughput of a reuse 2 frequency plan without precoding.

FIG. 4 illustrates the information throughput of a reuse 2 frequency plan without precoding. Here, the multi-beam satellite with a reuse 2 scheme arranges the two polarizations in separate alternate columns, left-hand circular polarization (LHCP) and right-hand circular polarization (RHCP). All the frequency of one polarization is used by all the cells in the column of cells plotted, whereas the cells using the other polarization are not shown. Interference from the adjacent cells as well as from the adjacent columns in the same polarization are accounted for, and the DVB-S2/S2X modcods are used to estimate the modulation and coding needed to provide the actual information throughput of each receiver location within a cell given the total signal to noise and interference at the location, assuming the beam center has a signal to noise ratio of 14 dB. From the figure, it can be seen that the interference is dominated by the nearest adjacent cell of the same column since the equal throughput contours are essentially horizontal lines for most parts of the cell. The adjacent cell that causes dominate adjacent interference may be referred to as the dominant adjacent interfering cell.

Figure 5:
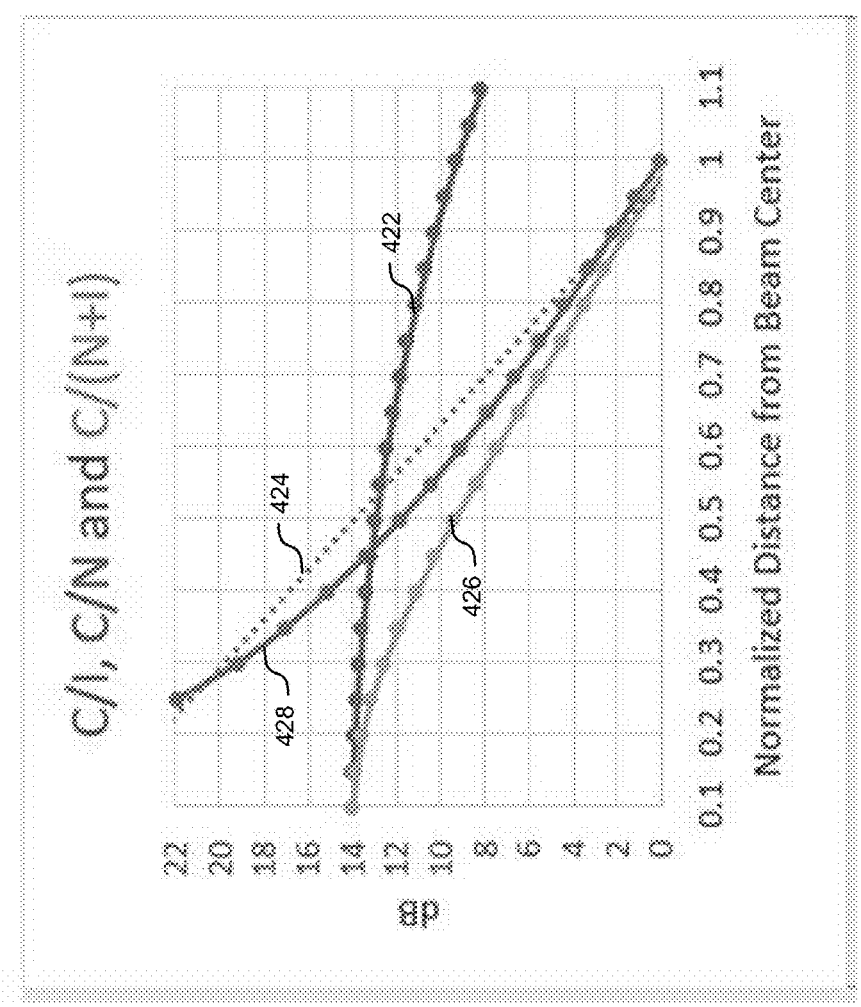
FIG. 5 illustrates an example of carrier-to-noise ratio, C/N 422, carrier-to-interference ratio, C/I and C/(N+I) for a receiver within the desired cell as a function of distance from the cell center, normalized to the distance between cell center to the cell edge bordering the dominate adjacent interfering cell.

FIG. 5 shows an example of carrier-to-noise ratio, C/N 422, carrier-to-interference ratio, C/I 428 and C/(N+I) 426 for a receiver within the desired cell as a function of distance from the cell center, normalized to the distance between cell center to the cell edge bordering the dominant adjacent interfering cell. (The dotted line 424 illustrates that the C/(N+I) 426 in dB falls off linearly with distance from the beam center). Here, only the dominant adjacent interference are accounted for, assuming both the desired cell and the dominant adjacent interference cell transmit at the same power level. It can be seen that the C/(N+I) 426 drops rapidly towards the cell boundary and that is the reason for rapid dropping information bit rate towards the cell boundary. One purpose of the precoding in various embodiments is to mitigate the fast decrease in the C/(N+I) to the extent possible.

The cell center region does experience some interference from the adjacent beam. The degradation caused by such interference will depend on the operating C/N and the location of the receiver. If the C/I is close to the C/N, the degradation due to the interference will be large. If the C/I is significantly higher than the C/N, the degradation due to the interference is small. To illustrate this point, assume the beam center has a C/N of 14 dB for the UTs defined for the system, i.e., given a UT system noise temperature. As an example, consider the point midway between the center and the edge of the cell as illustrated in FIG. 5. The C/N experienced by a UT at this point is 12.9 dB, which is capable of supporting 3.11 bits/symbol using 16-APSK and rate 7/9 code assuming the DVB-S2 modulation and coding modes by example. But, it experiences a C/I of 11.8 dB interference from the adjacent beam. So, the C/(N+I) is 9.3 dB, which can support 16-APSK with rate 26/45 coding or 2.3 bits/symbol. For a UT located at ¼ of the normalized distance from the beam center, the C/I is 22 dB and the C/N is 14 dB. C/(N+I) is 13.4 dB and is dominated by the noise. The degradation due to the interference is 0.6 dB, resulting in modest throughput reduction.

As the above illustrates, when a reuse 2 frequency plan such as the one shown in FIG. 4 is employed, the UTs near the edges of the cells experience a high level of interference from the nearest adjacent co-channel cell. In order to provide an adequate level of service to such UTs, adjacent cell interference is preferably mitigated. If a cell and its adjacent interfering cell are being served from the same GW, forward link precoding can be applied at the GW to achieve this objective. Since the GW has access to both the desired and interfering signals and antenna responses are known, interference can be precompensated in various embodiments prior to feeder uplink transmission to the satellite.

The situation in which the GW has access to signals of interfering cells is applicable to the case where the satellite is a "bent pipe" satellite, i.e., it is not performing on-board digital signal processing. In embodiments in which the satellite performs on-board signal processing, the precoding can be implemented in the satellite rather than in the Gateway. In other words, signals from adjacent cells, which may be served from different GWs, are uplinked to the satellite, where precoding is applied prior to transmission on the user downlink. In this case, the GWs may schedule their feeder link transmissions so that it is coordinated with the precoding matrix that is being applied at the satellite.

Some embodiments of the disclosure are applicable to satellite systems employing an antenna with a single feed per beam (SFPB) for the user links and where a number (>=2) of adjacent mutually interfering cells are served from the same GW. A SFPB antenna implies that the number of antenna feeds on the satellite is equal to the number of downlink user beams, which in turn is equal to the number of cells served by the gateway. The number of antenna feeds is an important parameter that determines the degrees of freedom available in the design of forward link precoding. Precoder performance can be improved by increasing the number of feeds per beam, since this allows more flexibility in controlling the beam response. However, increasing the number of feeds also increases the size and weight of the satellite as well as the feeder uplink bandwidth requirements. Consequently, for high throughput satellite systems, this is not a desirable option. Precoding based on a single feed per beam, as outlined in embodiments of this disclosure, can yield a much more practical solution.

However, there are satellite systems that use phased array or multiple feed per beam (MFPB) antenna technologies for the user downlink. Embodiments may be implemented to improve the reuse efficiency of such systems as well. The increased number of antenna elements or feeds may result in improved precoding performance. The higher number of elements (feeds) implies that each beam can be formed as the sum of a larger number of building blocks (i.e., element beams). This is equivalent to an increase in the degrees of freedom that are available in computing the precoder. Consequently, the resulting precoder may present a more optimal solution and achieve better interference reduction. In addition, the sector-pair based precoding and scheduling and restriction of allowed sector pairings (described below) are applicable to systems with phased array and MFPB antennas. The remainder of this disclosure describes solutions in terms of a single GW SFPB bent-pipe satellite system. After reading this description, one of ordinary skill in the art will understand that the techniques are applicable to multi-GW processing satellites, and satellites with phased array or MFPB antennas.

The number of cells served by the same GW depends on system parameters such as the available feeder link bandwidth, desired user link bandwidth, and the number of GWs and cells in the system. Some embodiments of the present disclosure implement a solution that decomposes the overall problem into a simpler problem of mutual interference between the two adjacent halves of two adjacent co-channel cells, both being served by the same GW. By framing the problem in this way, the solution may be largely independent of the other co-channel cells being served by the same GW and it may also be applicable to any SFPB system with GWs serving two or more contiguous co-channel cells.

Figure 6:
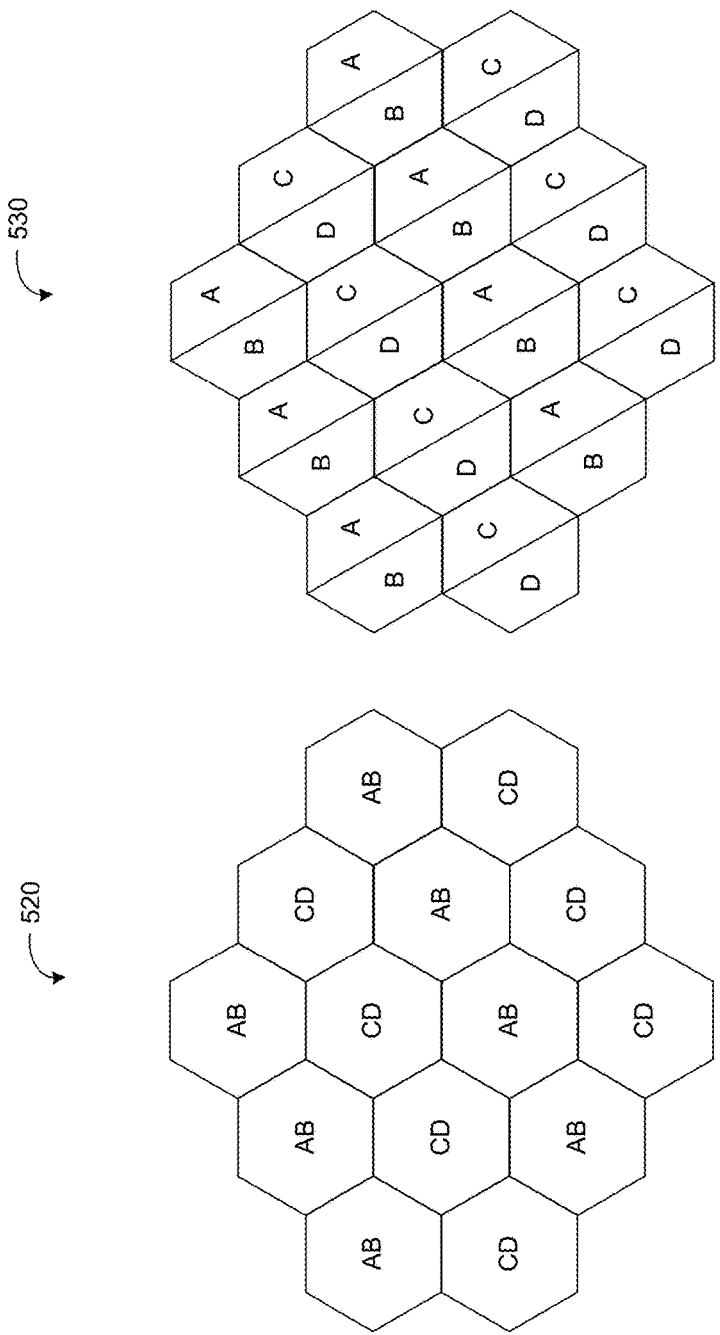
FIG. 6 is a diagram illustrating example reuse configurations in accordance with various embodiments.

FIG. 6 is a diagram illustrating example reuse configurations. In various embodiments, these example configurations can benefit from precoding even though they may not have a dominant interferer in the adjacent half-cell. For example, the example at 520 shows a 2-color reuse scheme in which the two carriers A, B, C, D serve the same part of the cell at the same time. But the example at 530 shows how the one carrier is dedicated to one half of the cell and the other is dedicated to the other half of the cell. In that case, there is no interference between adjacent halves. Precoding techniques proposed here can be applied to this case to mitigate interference between the two interfering (non-adjacent) halves of adjacent cells.

Figure 7:
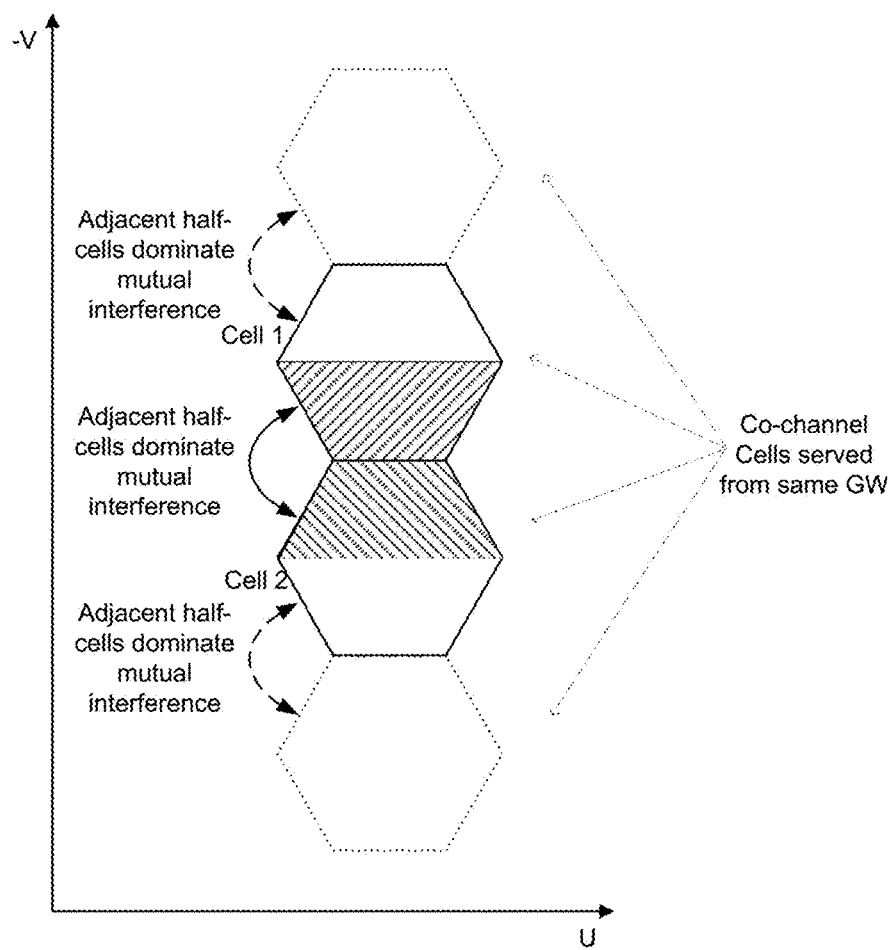
FIG. 7 illustrates an example of adjacent half-cell interference for a plurality of co-channel cells served from the same gateway.

FIG. 7 illustrates an example of adjacent half-cell interference for a plurality of co-channel cells served from the same gateway. As seen from this example in FIG. 7 and from the above discussion, interference at the edges of the cell is primarily due to the nearest adjacent co-channel cell. Likewise, interference from more distant co-channel cells is at a significantly lower level because typical spot beam response drops rapidly with distance from beam (cell) center. Thus, interference mitigation can be treated in some embodiments as a pairwise problem, considering only the adjacent halves of each pair of neighboring co-channel cells.

There are a number of well-known forward link precoding techniques familiar to those skilled the art, such as direct matrix inversion (DMI), zero-forcing (ZF), and regularized zero-forcing (RZF) (also known as minimum mean squared error or MMSE) precoding. Embodiments of the systems and methods described herein can be applied in conjunction with any of these or other precoding techniques and can be implemented to be independent of the specific precoding technique employed.

Figure 8:
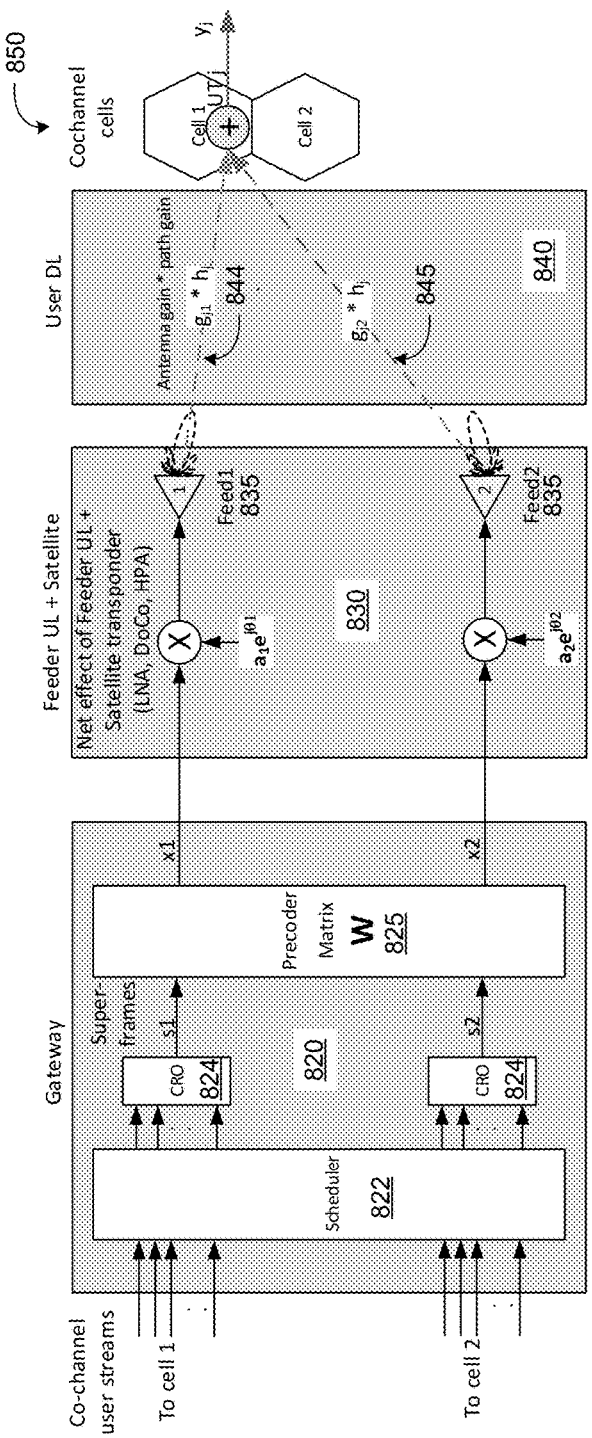
FIG. 8 is a block diagram illustrating an example application of forward link precoding in accordance with one embodiment of the systems and methods described herein.

FIG. 8 is a block diagram illustrating an example application of forward link precoding in accordance with one embodiment of the systems and methods described herein. This diagram illustrates an example of precoding in a GW serving 2 co-channel cells. This example includes a representative gateway 820, a representative satellite transponder and feeder links 830, and the user downlink 840. Also shown are two example co-channel cells 850 (Cell 1, Cell 2). In this example, representative gateway 820 includes a scheduling circuit 822, that accepts a plurality of co-channel user streams destined for identified cells. Scheduling circuit 822 includes input receivers to receive the user streams and a scheduling algorithm circuit to implement the scheduling algorithm to manage resources (e.g., DVB-S2 resources) for delivery of traffic flows to the UTs. Code Rate Organizer (CRO) circuits 824 have input receivers coupled to the output of scheduling circuit 822. CRO circuits 824 organize the transmission of data packets based on the respective modulation encoding rates so that spectrum utilization may be optimized. In some embodiments, CRO circuits 824 may dynamically estimate bandwidth capacity in terms of data rate and organize incoming data from IPGWs into a multiplexed data stream so as to fully utilize the spectrum bandwidth for transmission. The multiplexed data stream can then ultimately be broadcast to remote UTs associated with CRO circuits 824 via the feeder uplink and satellite transponders 830 and the user downlinks 840.

Precoder matrix circuit W 825 includes input receivers coupled to receive data frames (e.g., super frames) s1, s2 from CRO circuits 824. Precoder matrix W 825 may be implemented to perform the precoding as described in this disclosure. In this example, precoder matrix W 825 is precomputed based on known antenna pattern gains $\{g_{ji}\}$ between the feed i and UT j. In various embodiments, precoder matrix W may be computed based on Minimum Mean Square Error (MMSE) criterion to maximize C/(N+I) at selected sector locations. This can be computed using known channel gains (i.e., complex antenna response values) for the paths. Any differential phase or amplitude errors due to the feeder UL or satellite transponder may be corrected by a calibration process that can effectively factor out these errors.

As shown in this example, for discussion purposes, the user data streams to UTs (not shown) in each cell are organized into DVB-S2X superframes (e.g., ref. DVB-S2X annex E) by scheduling circuit 822 and a code rate organizer circuit 824. These superframe signals are processed by the precoding matrix W 825 to generate the RF signals x1, x2 that are transmitted over the feeder link to the satellite. It is noted that the use of superframes may not be required if all the data frames from the two cells have the same length in duration and are frame synchronized. It is important, however, that the receiver be able to synchronize to a transmission destined to it after losing synchronization in an immediately preceding transmission. This is because the Es/No (the ratio of the transmitted signal energy per symbol to the spectral noise density) may be very low when the beam former is not serving the sector in which the receiver is located.

The combined effect of differential magnitude and phase errors of feeder link transmission and satellite processing 830 is represented by the $\{a_i e^{j\theta_i}\}$ complex gain terms as shown. If these errors are significant, calibration mechanisms may be used to correct these errors. There are a number of approaches that can be employed to perform this calibration function. For example, the GW can insert a pilot tone signal with a known amplitude and phase in the feeder link signal and the differential amplitude and phase effects can be estimated by measuring the amplitude and phase of the pilot tone in the satellite. Embodiments of this disclosure work with any calibration technique that can properly compensate for the differential amplitude and phase errors.

The resulting signals 844, 845 are transmitted from antenna feeds 835 over user downlink 840 to the UTs in the destination cells 850. The UT receives the sum of the desired signal 844 and interference signal 845, relative levels depending on its location relative to the beam responses of the two beams.

Figure 9A:
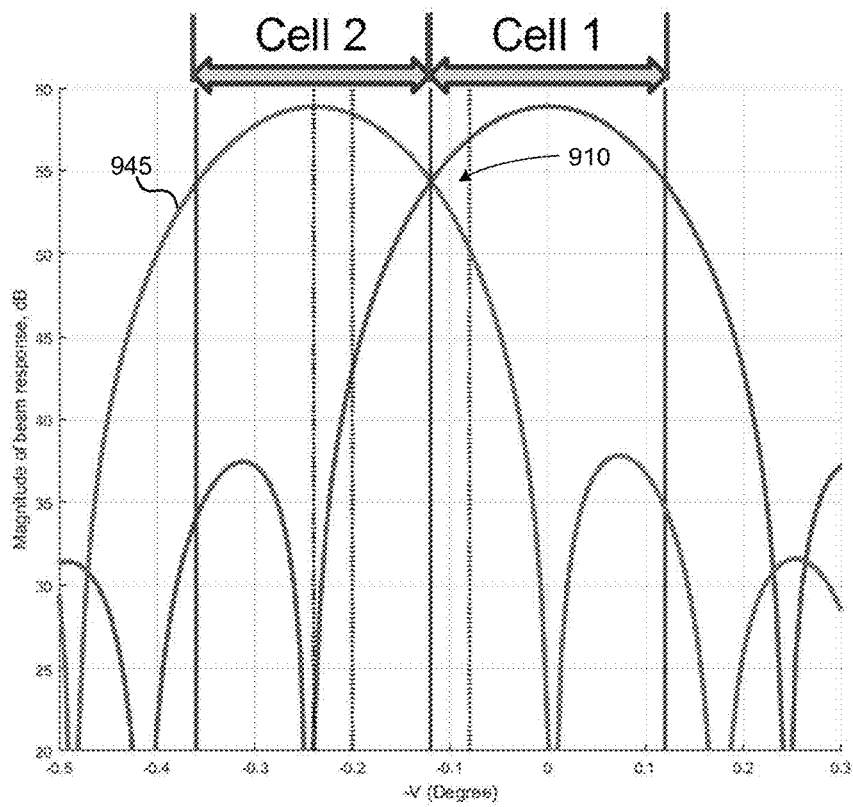
FIGS. 9A and 9B illustrate an example of the performance of precoding in the 2-cell case for non-adjacent sectors in accordance with one embodiment of the systems and methods described herein.
Figure 9B:
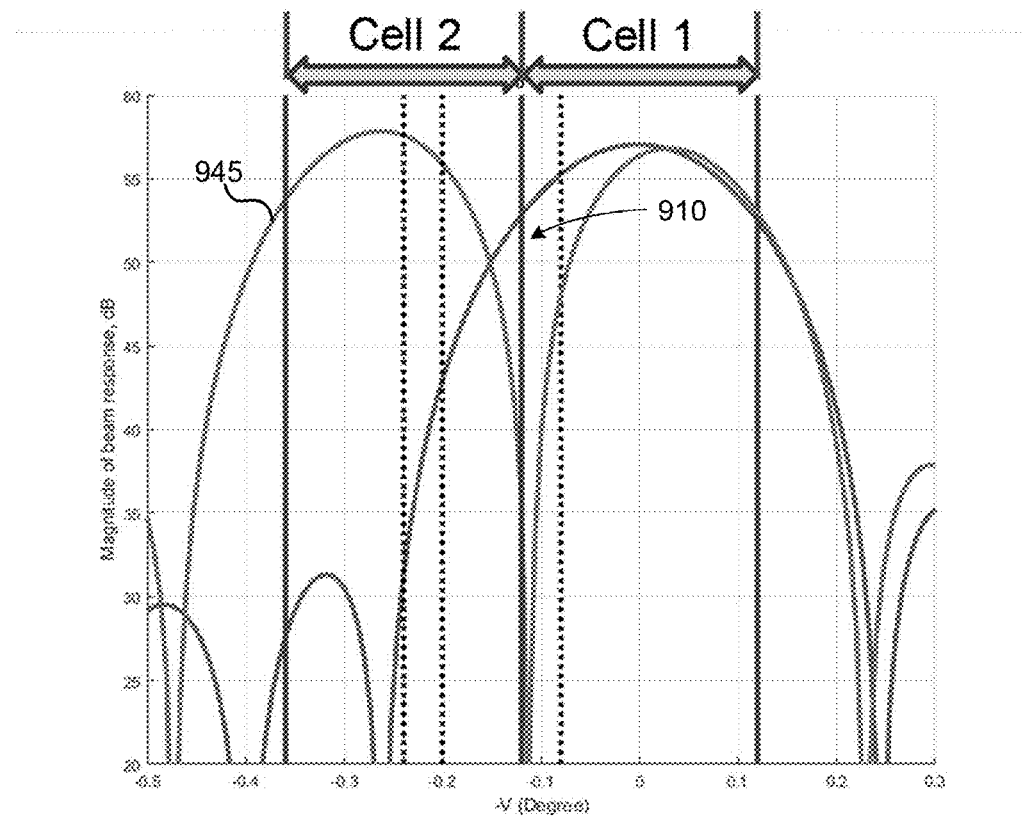

FIGS. 9A and 9B illustrate an example of the performance of precoding in the 2-cell case in accordance with one embodiment of the systems and methods described herein. FIG. 9A shows an area of high interference 910 in cell 1 caused by the main lobe of the signal 945 of cell 2 without any precoding. The example in FIG. 9B shows the effect of a RZF precoder that is applied to mitigate the interference from beam 2 945 to the UTs that are at the adjacent edge 910 of cell 1. The figure shows beam response cuts parallel to the V-axis through the centers of the cells 1 and 2. It is evident that the C/(N+I) at the region near the edge of the cell 1 910 is improved by precoding, due to the reduction in the level of the interfering beam response in that region. In this example, the average C/(N+I) within the edge "sector" was improved by 3.1 dB by the precoder as compared to the example case in FIG. 9A with no precoding. However, it can also be seen that the interfering beam response level increases at other regions in cell 1, thereby causing a deterioration in C/(N+I) performance and throughput. For example in a region near the center of cell 1, the average C/(N+I) deteriorates by 7.1 dB as compared to the case of no precoding.

It is clear from the above that when the precoder in the above example is used, the link to UTs in the edge sector 910 is significantly improved, but the link to the UTs near the center deteriorates significantly. This problem can be addressed by recognizing such conditions and allowing transmission destined only to UTs near the edge during the time interval this precoder is applied at the GW. In successive time intervals, the GW can use other precoders, designed to improve the user link to other sectors in the cell and transmit data destined only to the UTs located within those sectors. The time intervals to "dwell" on each sector can be determined based on the outroute traffic destined to each of these sectors.

Figure 10A:
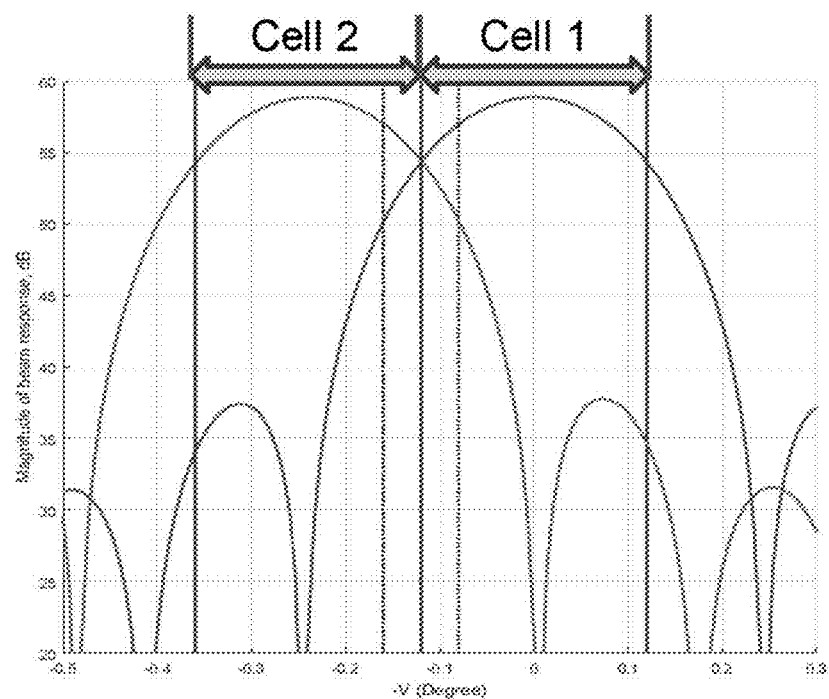
FIGS. 10A and 10B illustrate an example of shaping a beam to reduce its (interference) level adjacent sectors of adjacent cells causing a reduction in the (desired signal) level within its own cell.
Figure 10B:
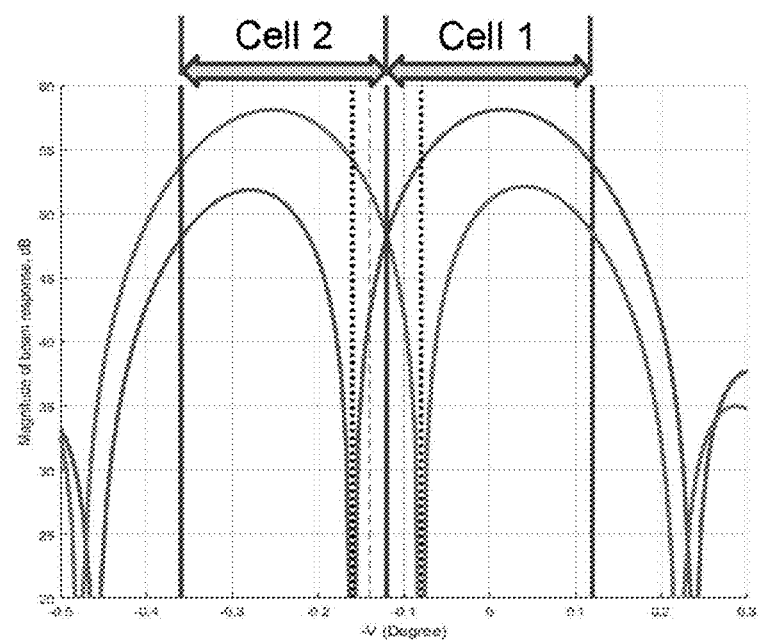

Shaping a beam to reduce its (interference) level in a sector of the adjacent cell has the undesirable side effect of reducing the (desired signal) level within its own cell. This is because reducing the interference level requires placing a null in the mainlobe of the antenna response. This reduction is smaller with increasing distance from the null. However, in the proximity of the null, the signal level drop is significant. An example of this is illustrated in FIG. 10. FIG. 10a illustrates the signals without beam shaping and FIG. 10b with beam shaping. Here, the precoder is shaping the two adjacent beams to reduce the interference at the adjacent edge sectors of the two cells. While the interference levels are reduced, the desired signal levels are also reduced significantly because each beam is creating a null too close to the sector to which it is transmitting. The net result is there is no improvement in throughput relative to a 3-color reuse for both the cells. This illustrates that with reuse-2, even with precoding, it is not practical for the two cells to be transmitting at the same time to sectors that are close to each other. The determination of what pairings of sectors are too close and should be avoided is determined based on an analysis of precoder performance.

Embodiments can be implemented to avoid the problems illustrated in FIG. 10. For example, in one embodiment this can be avoided by coordinating transmissions between the two cells such that if one cell is transmitting to its edge sector, the adjacent cell can only transmit to one of its interior sectors. For the purposes of this coordination, each cell can be considered as multiple sectors. For example, in one embodiment each cell can be considered as two halves. Each half-cell has only one dominant adjacent interfering cell, and precoding and scheduling may be jointly coordinated between a half cell and its dominant adjacent interfering half-cell. This does not preclude beam forming when adjacent cells are not transmitting into dominant and interfering half-cells.

Figure 11:
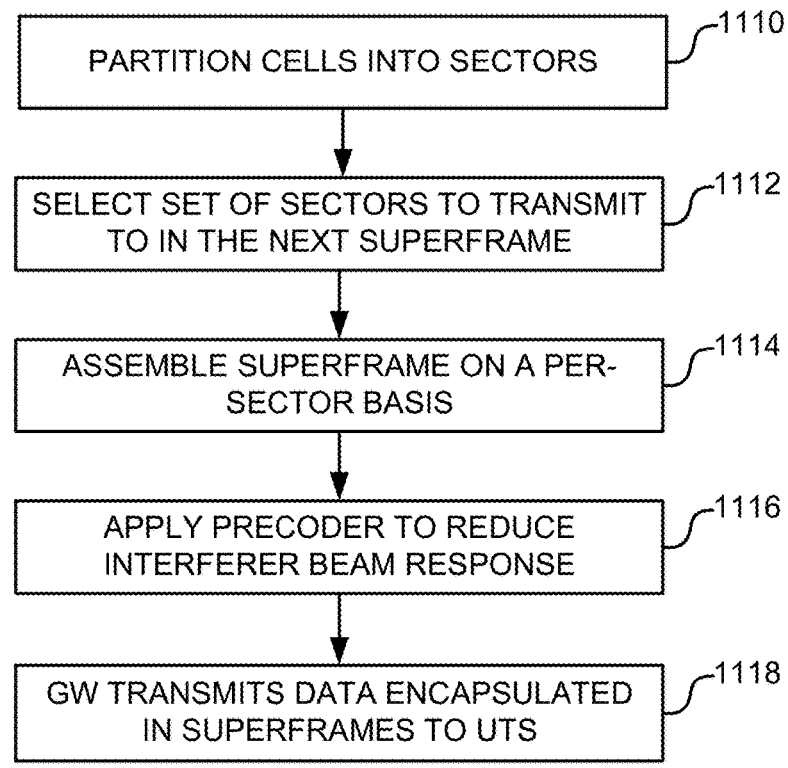
FIG. 11 illustrates an example process combining cell sectorization, sector-pair based precoding and scheduling constraints in accordance with one embodiment of the systems and methods described herein.
Figure 12:
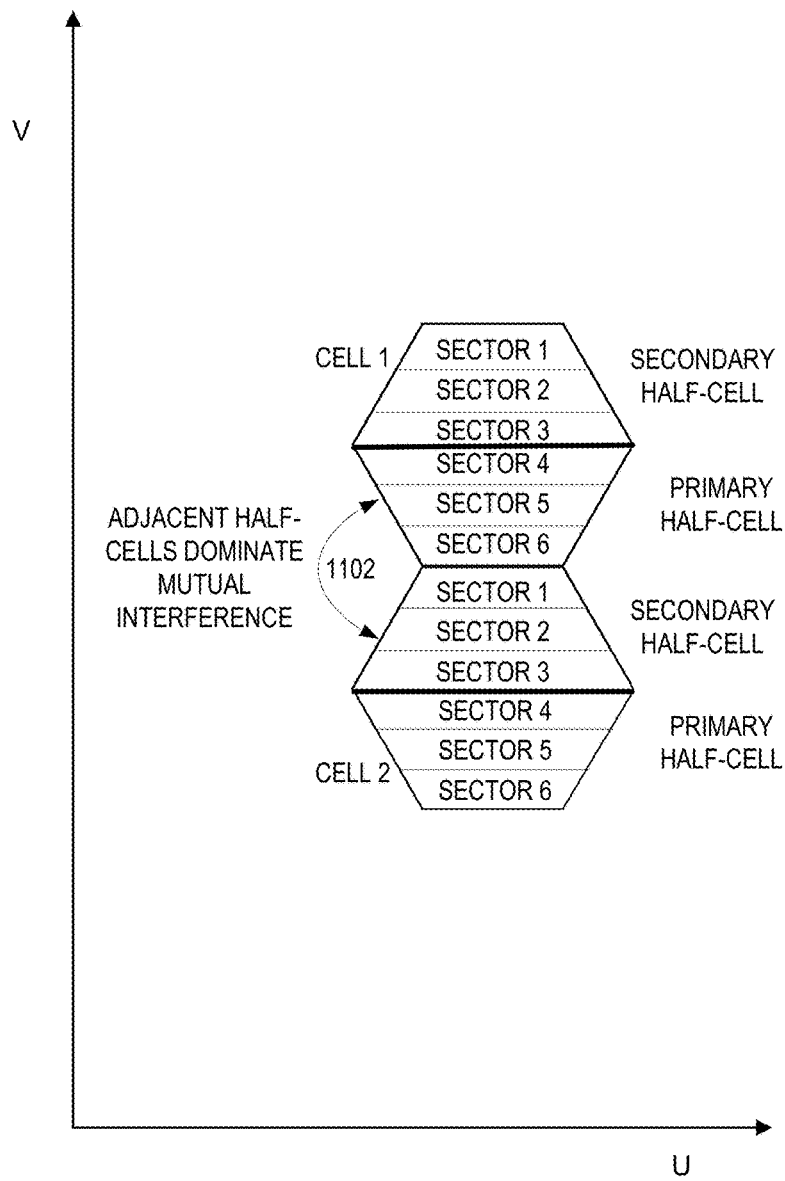
FIG. 12 illustrates an example of two adjacent cells and their sectors in accordance with one embodiment of the disclosed technology.

FIG. 11 illustrates an example process combining cell sectorization, sector-pair based precoding and scheduling constraints in accordance with one embodiment of the systems and methods described herein. FIG. 12 illustrates an example of two adjacent cells and their sectors in accordance with one embodiment of the disclosed technology. The example in FIG. 12 illustrates two adjacent cells, Cell 1, Cell 2, and the adjacent half cells 1102 that dominate the mutual interference. Referring now to FIGS. 11 and 12, at operation 1110, the cells are partitioned into a number of sectors. In some embodiments, the cells may be partitioned in advance as part of the system design. In the illustrated example, the cells are partitioned into six sectors (Sectors 1-6) for each cell. In one embodiment the cells are partitioned such that sector boundaries are roughly along equal C/(N+I) contours within the cell. For example, for the arrangement of cells in FIG. 3 or FIG. 5, equal C/(N+I) contours are roughly horizontal (parallel to the U-axis). Accordingly, in this example the sectors are created as shown in the example of FIG. 12. The number of sectors is a design parameter that trades performance improvement against reduction in outroute statistical multiplexing efficiency. For illustrative purposes, the example of FIG. 12 shows 6 sectors/cell. In other embodiments, the cells can be partitioned into other numbers of sectors. In the illustrated example, the sectors have a uniform height (size along the V-axis). However, the sizing of the sectors does not have to be uniform and in other examples the sectors can be non-uniformly sized based on criteria such as, for example, the distribution of UTs in a cell. Non-uniform sectors may allow for reducing the number of sectors (thereby reducing precoder implementation complexity) while maintaining the performance of the precoding.

At operation 1112, the system selects a set of sectors to which the data will be transmitted. For example, in embodiments implementing superframes, the system selects a set of sectors to which to transmit in the next superframe. At operation 1114, the superframes are assembled on a per-sector basis. That is, each superframe is assembled to contain data destined to UTs located within a single sector. As one example, at the GW, each outroute DVB S2X superframe is assembled on a per-sector basis. In embodiments in which the superframe has a fixed time duration for a given outroute symbol rate, changes to precoding to target different sectors can occur at superframe boundaries, simplifying the operation of this approach. In some embodiments, superframes may be queued on a per sector basis, while in other embodiments superframes may be queued as a single queue for the entire cell.

Precoder computing may be performed based on the targeted sector locations rather than on the locations of individual UTs receiving the data. In one embodiment, a sector location is specified as the geographic center of the sector for the purposes of computing the precoder. Other embodiments may specify the location of the sector in other ways. For example, the location of the sector may be defined as the centroid of the distribution of UTs within the sector or as the location that results in beam shapes that result in the highest average throughput for the UTs in the sector. Computing the precoder based on sector locations rather than on the location of UTs may significantly reduce computational complexity. This is because cell sectorization is fixed (or changes infrequently), whereas the locations of the UTs receiving data is generally highly dynamic. As a result the former allows for precomputation of the precoder (as discussed below); whereas the latter requires real time computation of the precoder depending on the specific locations of the UTs that are currently receiving the data. Such real time computation generally increases the computation complexity of the gateway significantly.

At operation 1116 a precoder to reduce interferer beam response is applied at the gateway. For example, in the case of the example in FIG. 8, Precoder matrix circuit W 825 in gateway a 20 applies precoding to reduce interferer beam responses. As an example, consider the case in which a GW is serving a pair of sectors, one from each of the two adjacent half-cells. In such a case, a specific precoder designed to reduce interferer beam responses (i.e., improve the C/(N+I)) within this pair of sectors may be applied at the GW during this time interval.

A single outroute serves only one cell. When the outroute transmission in a cell (for example cell 1 in FIG. 7) is destined to UTs in one of the two halves, there are two possibilities. One possibility is that the adjacent cell (cell 2) transmission is destined to UTs in the dominant half-cell. In this case, embodiments may coordinate the transmission destinations in cells 1 and 2 to ensure that the two destination sectors are not too close to each other. Another possibility is that the adjacent cell (cell 2) transmission is not destined to the UTs in the dominant half-cell, but to UTs in the other (non-dominant) half-cell. In this case, cell 1 can transmit freely to any of its sectors without coordinating with cell 2. Note, however, that cell 2 may have to coordinate with its other adjacent cell, based on the same rules.

At operation 1118, in any interval of time, the GW transmits data encapsulated in superframes to UTs in each cell it serves.

In the first case above, when both cells are transmitting to their adjacent half-cells, some embodiments may employ a mechanism to apply constraints on the distance between sectors. One mechanism is prioritize one half-cell over the other. Alternatively, the choice of which cell is primary can be dynamic. For example, it can be made randomly or it can alternate (e.g., on each superframe or every x superframes, etc.).

First consider the case of fixed priority. In some embodiments, one half-cell (for example, the bottom half cell in FIG. 12) is designated as the primary half-cell and the other half-cell as the secondary half-cell. In any time interval, if the GW determines that outroute data for the two cells are destined to sectors that are too close, the primary half takes priority over the secondary half. That is, in one embodiment, the GW allows the transmission of the data for the primary half-cell and the currently designated secondary half-cell data is not transmitted in this interval.

The GW examines the packets enqueued for the adjacent cell, until it finds a packet destined to its primary half (i.e., non-dominating half) or to a sector in its secondary half that is at a sufficient distance from the current destination sector in the primary half-cell. These selected packets are forwarded to the code rate organizer (CRO) (e.g., CRO 824 in FIG. 8), which encapsulates them into a superframe for transmission over the outroute. Thus, in any time interval, the GW examines the packets enqueued for all its cells to determine if scheduling coordination is required for each pair of cells. If for any pair of cells (such as cells 1 and 2), if the enqueued data on the two outroutes are to adjacent half-cells and the two destination sectors are too close to each other, it follows the rules discussed above in scheduling data for transmission.

Figure 13:
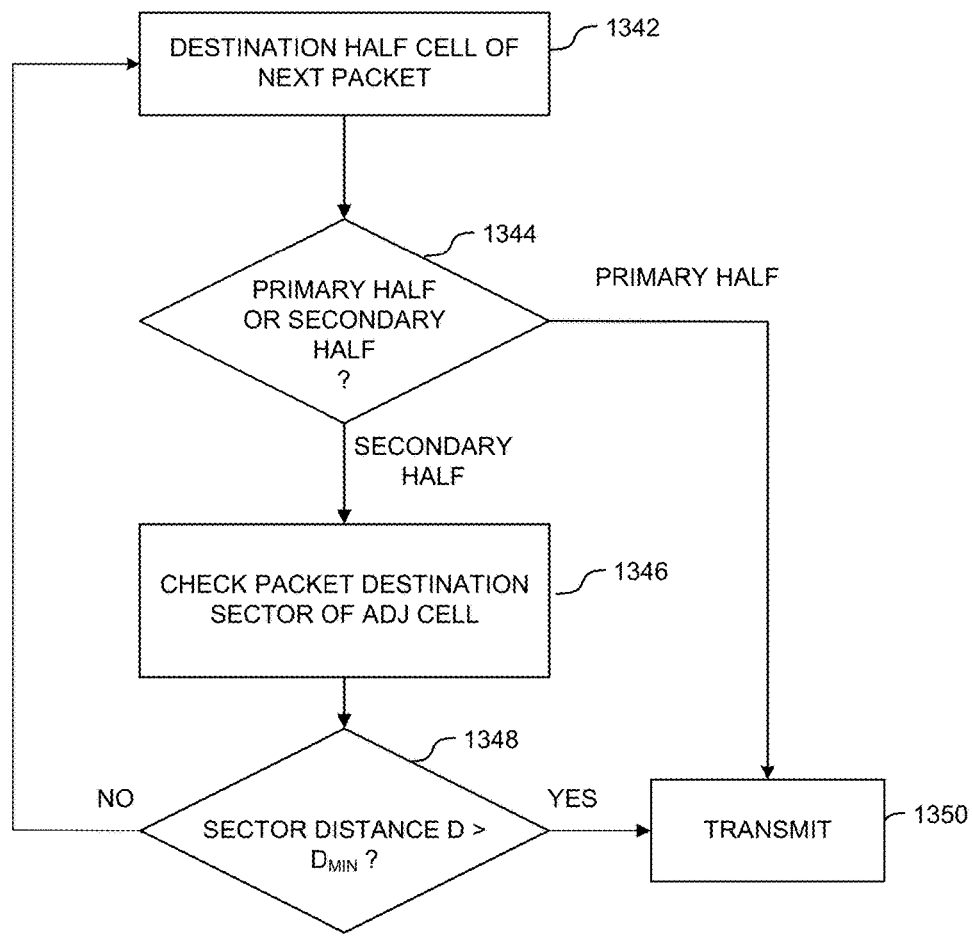
FIG. 13 is a flow diagram illustrating an example process for determining whether to transmit a packet in accordance with one embodiment of the systems and methods described herein.

FIG. 13 is a flow diagram illustrating an example process for determining whether to transmit a packet in accordance with one embodiment of the systems and methods described herein. At operation 1342, the gateway (e.g., gateway 820 of FIG. 8) determines the destination half-cell of the next packet in the queue. At operation 1344, the gateway determines whether this next packet is destined for the primary half-cell or the secondary half-cell. If the packet is destined for the primary half-cell, the gateway transmits the packet as illustrated at operation 1350. If, on the other hand, the packet is destined for the secondary half the gateway further checks the packet destination sector of the adjacent cell. This is illustrated at operation 1346. If the sector distance, D, is greater than the minimum distance between the destination sectors of the two cells of interest, $d_{min}$, the gateway transmits the packet as illustrated at operation 1350. If, on the other hand, distance between the sectors, D, is not greater than the minimum distance between the destination sectors of the two cells of interest, the gateway continues by examining the destination half-cell of the next packet at operation 1342. The process can then continue to find packets destined for sectors of sufficient distance, D, to mitigate interference.

Figure 14:
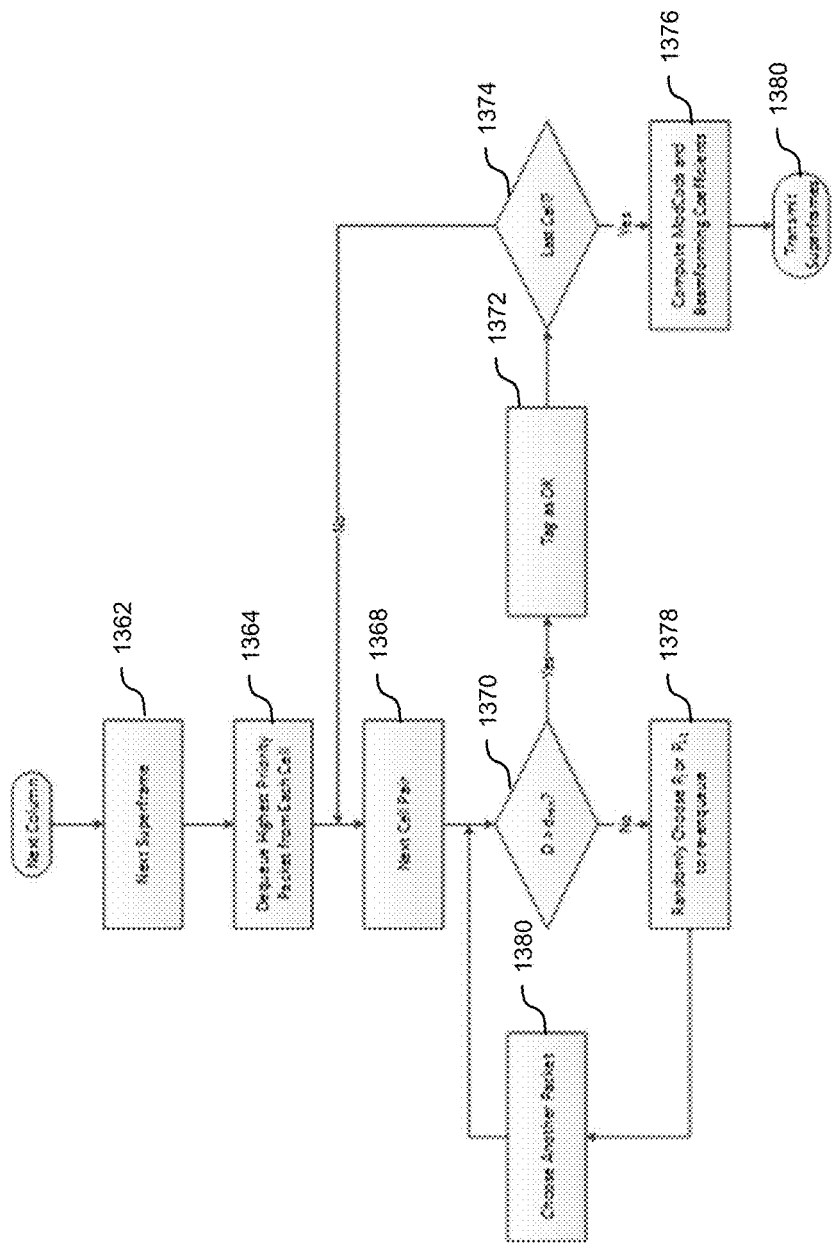
FIG. 14 illustrates an example of an alternative de-queuing mechanism in accordance with one embodiment of the systems and methods described herein.

FIG. 14 illustrates an example of an alternative de-queuing mechanism in accordance with one embodiment of the systems and methods described herein. In this case, the gateway circuitry selects a candidate packet from all of the cells in a column to create a vector of sectors that may be used in this superframe. At operation 1362, the gateway loads the next superframe for processing. At operation 1364, the gateway circuitry selects the candidate packet. In the example illustrated in FIG. 13, it selects the highest priority packet from a given cell. At operation 1368, the gateway then starts at the "top" of the column and checks each pair of cells for distance. If at operation 1370, the gateway determines that the distance is acceptable (e.g., the sector distance, D, is greater than the minimum distance between the destination sectors of the two cells of interest, $d_{min}$) the pair is temporarily tagged as OK. This is shown at operation 1372. At operation 1374, the system determines whether this is the last cell to be processed. If not, the next cell pair is retrieved at operation 1368 and the operation continues. If this is the last cell, at operation 1376 the data is then coded with appropriate modcods and the beamforming coefficients are selected. At operation 1380, the superframes are transmitted.

Returning now to operation 1370, if it is determined that the distance is not acceptable, then at operations 1378 and 1380 either the upper or lower packet is returned to the queue and another packet is extracted until an acceptable distance is found. Note that this example process may result in previously "tagged OK" packets being returned to queue. When each pair of cells has been examined, an acceptable vector has been created for this column and superframe.

As the above scenarios illustrate, embodiments can be implemented to provide precoding targeted at sectors within the cells. While a greater number of sectors per cell can provide better precoding performance, this may impact the statistical multiplexing efficiency. Therefore, as discussed above, design trade-offs can be made to optimize performance for the desired application. Embodiments can be implemented to precode for one sector in each of the cells at a time. Then, in any time interval, the GW selects one sector from each of its cells, applies a precoder that jointly mitigates interference in the selected combination of sectors, and only transmits data destined to UTs within these selected sectors. The process may be repeated such that over successive intervals of time, all sectors in all cells are covered. In various embodiments, the process of applying different precoders in different time intervals may be simplified by time aligning superframe boundaries across outroutes to all cells, which can allow precoders to be switched at superframe boundaries.

In order to illustrate performance gains, it is useful to compare the forward link throughput of a system with a 2 color frequency reuse (K=2) with precoding and pairwise sector-based scheduling against that of a conventional 3-color reuse system (K=3). Assume a scenario in which the 3-color reuse system operates with a 450 Msps outroute carrier and 14.5 dB peak SNR (i.e., SNR for a UT located at the peak of the beam). The carrier symbol rate for the 2 color reuse system increases by a factor of 1.5 times to 675 Msps and its peak SNR is lowered to 12.7 dB (by 10*log 10(1.5)=1.8 dB), since the noise bandwidth increases by the same factor.

In some embodiments, each cell is partitioned into 6 sectors of uniform height, as shown in the example of FIG. 12. Cells can be partitioned based on other criteria as well. For example, in some embodiments cells can be partitioned such that the number of UTs in the sectors within a half-cell are roughly equal. For the two dominant interfering half-cells, the sectors are numbered as shown in some embodiments. In order to prevent simultaneously transmitting to sectors that are too close to each other, scheduling constraints can be used. An example of scheduling constraints is shown in Table 1.

TABLE 1

Scheduling Constraints

| | | IF CELL 1 IS TRANSMITTING TO: | | |
|---|---|---|---|---|
| | | 4 | 5 | 6 |
| CELL 2 CAN TRANSMIT TO: | 1 | YES | NO | NO |
| | 2 | YES | YES | NO |
| | 3 | YES | YES | YES |

The percent improvement in throughput provided by the above 2 color reuse with precoding and pairwise scheduling relative to the 3-color reuse was modeled. The cells were assumed to contain a uniform distribution of about 572 UTs/half-cell. Throughput was computed by computing the C/(N+I) ratio for each UT, and using the DVB-S2X ModCods (in DVB-2X implementations) to determine the spectral efficiency in bits/symbol, which is multiplied by the carrier rates to obtain throughput in bits/sec for each UT for each system. The results showed an improvement in per sector throughput, averaged across all the UTs within a sector. They further showed that the average sector throughput is always higher for the precoded case and is significantly higher (19%-32%) when transmitting to interior (i.e., non-edge) sectors.

Improvement can also be seen by UTs within a sector. When transmitting to the edge sectors 6 or 1, the simulations in the example configuration showed that the throughput for the K=2 precoded case was same as the throughput for the K=3 case. In all other cases, the minimum throughput is also improved (12.5%-33%) over reuse 3. As demonstrated in another example discussed below, a lack of improvement for the edge sectors may be experienced due to the granularity of the precoding coefficients, which is designed for the center of each sector, and an improvement can be observed when a half-cell is divided into 6 sectors instead of 3.

To compare the throughput improvement averaged across the entire cell, it can be assumed that the GW allocates equal outroute time/UT. That is, that each UT receives outroute data for the same time duration. Under this assumption, the 3-color reuse system averages a throughput of 1141 Mbps across the cell. The 2-color reuse system with precoding and scheduling constraints and 6 sectors/cell averages a throughput of 1340 Mbps, which is a 17.5% improvement over 3-color reuse.

Figure 15:
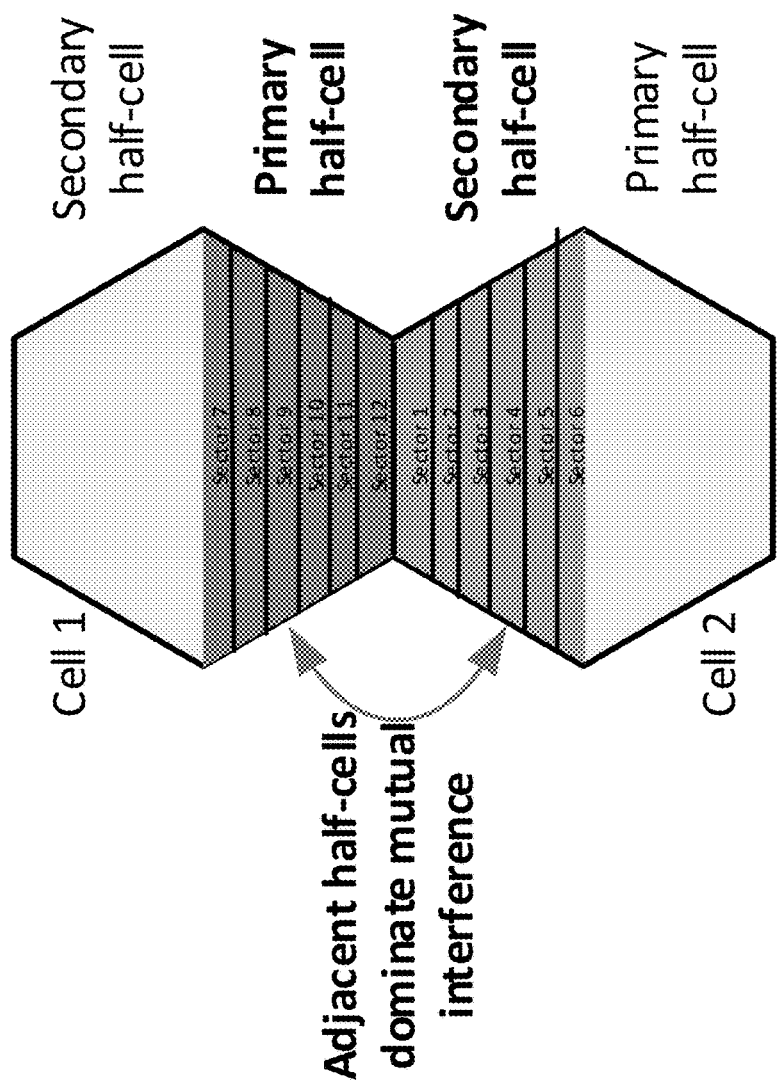
FIG. 15 is a diagram illustrating an example cell partitioning with 6 sectors per half-cell in accordance with one embodiment of the systems and methods described herein.

Partitioning is not limited to three sectors per half-cell. Indeed, by partitioning the cell into more sectors, it is possible to improve C/(N+I). FIG. 15 is a diagram illustrating an example cell partitioning with 6 sectors per half-cell in accordance with one embodiment of the systems and methods described herein. With more sectors (1-6, and 7-12) per cell, sector size is smaller and the precoder can be designed reduce interference to lower levels because more UTs in the sector lie closer to the null in the beam response. However, this also requires more subdividing of the UT community, possibly reducing the statistical multiplexing gains of the TDM outroute.

With 6 sectors per half-cell, the scheduling constraints that can be used for the precoding to provide performance improvements are shown in Table 2.

TABLE 2

Scheduling Constraints

| | | IF CELL 1 IS TRANSMITTING TO: | | | | | |
|---|---|---|---|---|---|---|---|
| | | 7 | 8 | 9 | 10 | 11 | 12 |
| CELL 2 CAN TRANSMIT TO: | 1 | YES | YES | NO | NO | NO | NO |
| | 2 | YES | YES | YES | NO | NO | NO |
| | 3 | YES | YES | YES | YES | NO | NO |
| | 4 | YES | YES | YES | YES | YES | NO |
| | 5 | YES | YES | YES | YES | YES | YES |
| | 6 | YES | YES | YES | YES | YES | YES |

Because scheduling constraints may prevent simultaneous transmission to certain sector combinations, various embodiments may be configured to evaluate and take into account the probability of such an event, called re-enqueueing probability.

For this analysis, embodiments may assume cell partitioning. For example, assume that the cells are partitioned to 3 sectors/half-cell as shown in FIG. 12, and also assume a uniform distribution of UTs. In this scenario, 43% of UTs are in the center-most sectors (3 or 4), 32% of the UTs are in middle sectors (2 or 5) and 25% of the UTs are in edge sectors (1 or 6). With these assumptions, consider the re-enqueueing probability for cell 2, assuming cell 1 is transmitting to its primary half, i.e., to sectors 4, 5 or 6. Cell 2 is blocked only when it is transmitting to its secondary half, i.e., sectors 1, 2, or 3. This occurs only 50% of the time, because the UTs are uniformly distributed.

Figure 16:
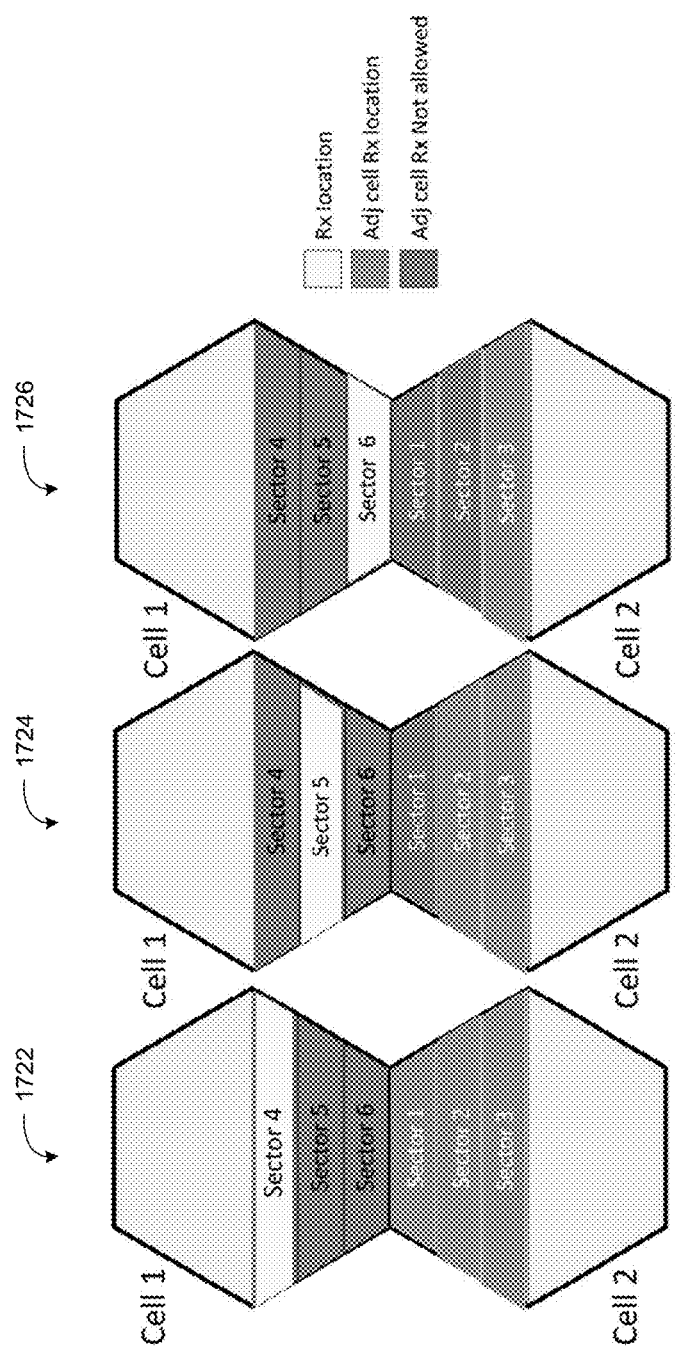
FIG. 16 illustrates combinations of sectors in adjacent half-cells for which simultaneous transmission is permitted in a situation in which cells are partitioned into three sectors per half-cell with a uniform distribution of UTs.

FIG. 16 illustrates re-enqueueing scenarios for a situation in which cells are partitioned into three sectors per half-cell with a uniform distribution of UTs. Referring now to FIG. 16, in the first example scenario 1722, cell 1 is transmitting to sector 4. In this case, because Sector 4 is sufficiently distant from Cell 2, Cell 2 can transmit to all sectors, including Sectors 1, 2 and 3 with no restriction. In the second example scenario 1724, Cell 1 is transmitting to sector 5. In this example, Cell 2 can also transmit to its entire cell (including Sectors 2 and 3) except to its Sector 1. In the third example scenario 1726, Cell 1 is transmitting to Sector 6, which is an edge sector. In this case, Cell 2 cannot transmit to its Sectors 1 and 2 because of their proximity to the adjacent Cell 1.

As the traffic is generally destined to receivers uniformly distributed within a cell, this coordination is not very restrictive. Only 50% of the time, checking on the destination receiver location in the adjacent dominating interfering beam is needed. Assuming the traffic in the adjacent beam is also uniformly distributed, out of the 50% time cell 2 is transmitting to its secondary half, only 25% of the time (or about 12.5% overall), the cell 2 needs to delay its transmission to its edge sector 1, if cell 1 is transmitting to its sector 5. Similarly, cell 2 needs to delay its transmission to both sectors 1 and 2, which is 57% of time (or 26.5% overall), if cell 1 is transmitting to its sector 6. So the impact on cell 2 of cell 1 transmitting to its primary half is re-enqueueing with a probability of 0.5*(0.32*0.25+0.25*0.57)=0.10875. In other words, about 10% of the time, a cell may be required to delay the transmission to a sector. However, note that this transmission opportunity can be used to transmit other enqueued data to one of its other sectors. Accordingly, the probability of a wasted transmission opportunity during high traffic periods is nearly zero.

Figure 17:
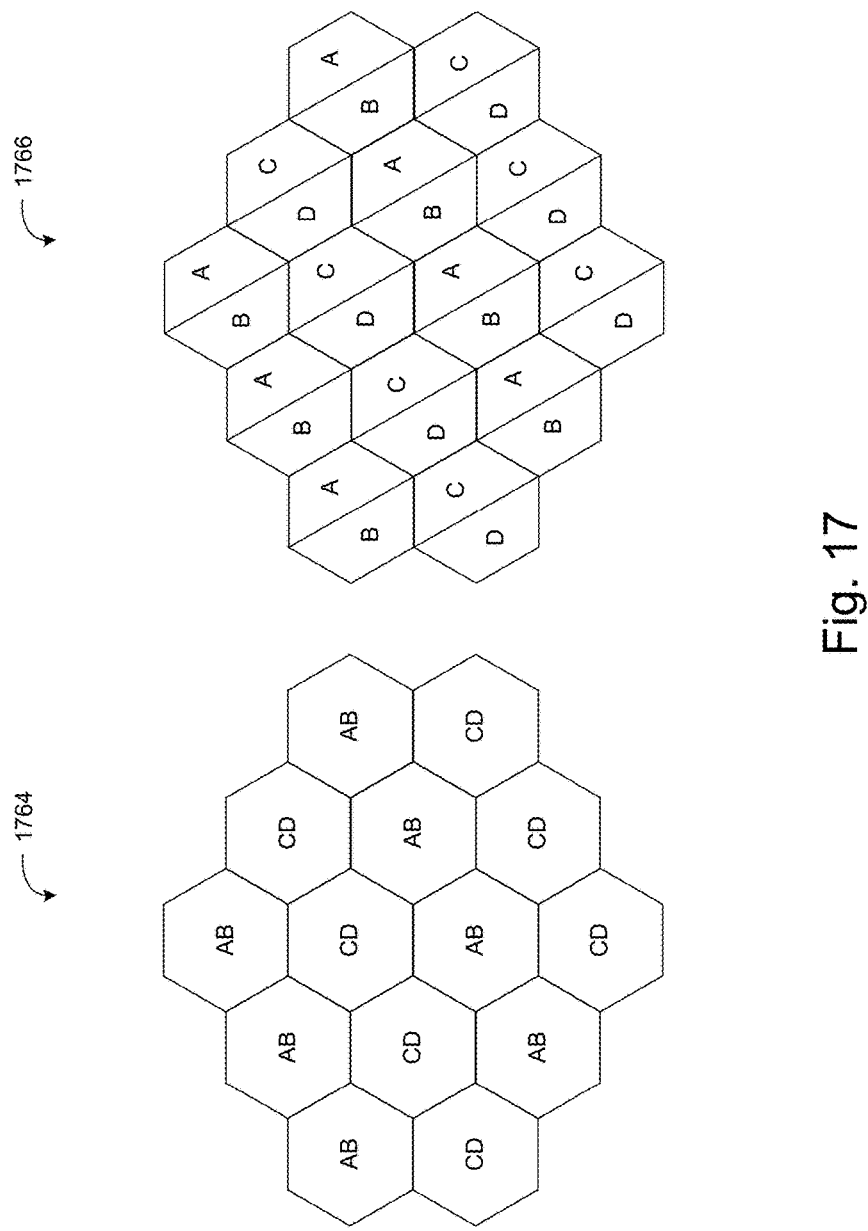
FIG. 17 illustrates a baseline reuse-2 configuration and a configuration on which upper and lower halves of the cell use different frequencies in accordance with one embodiment of the systems and methods described herein.

Interference is reduced, and C/(N+I) is increased when adjacent cell transmissions are in the same half-cell. Accordingly, various embodiments can implement an alternative approach in which the upper and lower halves of the cell use different frequencies. FIG. 17 illustrates a baseline reuse-2 configuration 1764 and a configuration on which upper and lower halves of the cell use different frequencies 1766 in accordance with one embodiment of the systems and methods described herein.

This is still reuse 2 because each cell is still using half the total spectrum, but the users in the upper and lower halves of the cells use different sub-bands within the overall allocated spectrum. This offers the advantages of increased C/(N+I) and simplified queue management, at the expense of reduced statistical multiplexing gain and increased sensitivity to non-uniform traffic distributions. It also allows a single GW to serve more beams by just serving one of the channels per cell.

Figure 18:
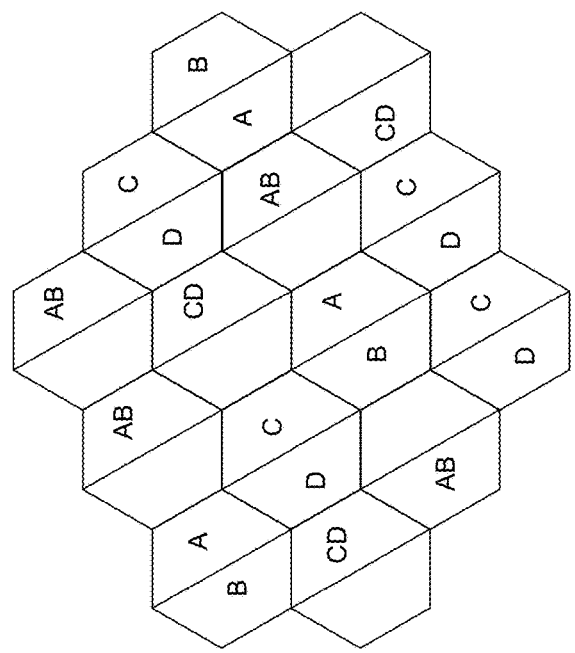
FIG. 18 illustrates another reuse-2 scheme in accordance with one embodiment of the systems and methods described herein.
Figure 18:
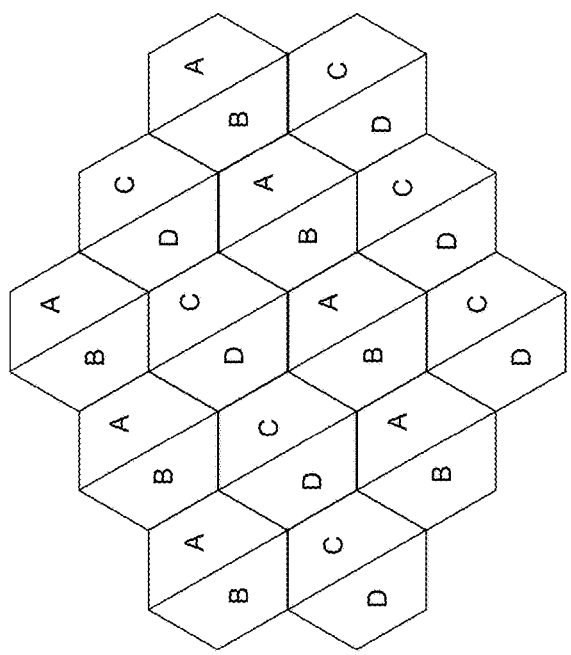

FIG. 18 illustrates another reuse-2 scheme in accordance with one embodiment of the systems and methods described herein. Each cell can use each carrier in either half-cell during any superframe. This mitigates a large part of the statistical multiplexing losses associated with the cell splitting. Each carrier selection operates essentially independently, but can achieve a higher $d_{min}$ than the basic reuse 2.

Each superframe in each carrier in each beam will carry traffic for a determined set of UTs in a specific sector. The UTs in that sector will not, however receive the same C/(N+I) as shown in Table 3. In addition, this value will change as a function of weather. The encoder at the GW needs to know this information for each UT for each superframe.

Table 3. EsNo Variation

TABLE 3

EsNo Variation

| Cell1, Sect1 | Cell 2, Sect2 | Cell 1 EsNo | | | Cell 2 EsNo | | |
|---|---|---|---|---|---|---|---|
| | | min | avg | max | min | avg | max |
| 4 | 1 | 4.99 | 8.24 | 10.87 | 3.07 | 5.22 | 6.85 |
| 4 | 2 | 5.84 | 9.56 | 12.06 | 4.94 | 8 | 9.99 |
| 4 | 3 | 5.35 | 9.38 | 11.83 | 4.83 | 9.33 | 11.6 |
| 5 | 1 | 2.14 | 6 | 9.43 | 1.55 | 5.03 | 7 |
| 5 | 2 | 4.69 | 7.85 | 10.81 | 5.01 | 8.02 | 10.73 |
| 5 | 3 | 4.94 | 7.94 | 10.77 | 5.41 | 9.56 | 11.9 |
| 6 | 1 | −1.41 | 1.48 | 3.94 | −0.64 | 2.24 | 4.74 |
| 6 | 2 | 1.48 | 4.75 | 6.57 | 1.84 | 5.74 | 9.08 |
| 6 | 3 | 2.81 | 5.09 | 6.74 | 5 | 8.25 | 10.86 |

As the combination of selected sectors continually changes, it is useful to correspondingly change the precoder matrix coefficients so that the formed beams have the desired characteristics. This implies that the precoder coefficients may change every few codeblocks or superframe. If these coefficients have to be computed in real-time, this may result in a significant increase in the complexity of the gateway. However, this real-time computation can be avoided because the cell sectorization is predetermined and the antenna responses are known apriori. By precomputing the entire set of precoding coefficients for all possible sector combinations and storing the results in a table (e.g., in non-volatile memory), the required coefficients for each superframe can be obtained by reading from this memory. In this approach, the calibration correction to compensate for feeder link and satellite processing is applied to the feeder link signal after processing by the precoder. This makes the precoder coefficients independent of time varying and unpredictable calibration errors, and hence makes the precomputation of the precoder coefficients feasible.

Embodiments may be implemented to take advantage of the superframe alignment, but treat precoding as a pair-wise problem between adjacent cells, using locations of the destination receivers to determine the precoding coefficients. This can be used to simplify the implementation substantially by only eliminating the dominant adjacent cell interference.

Figure 19:
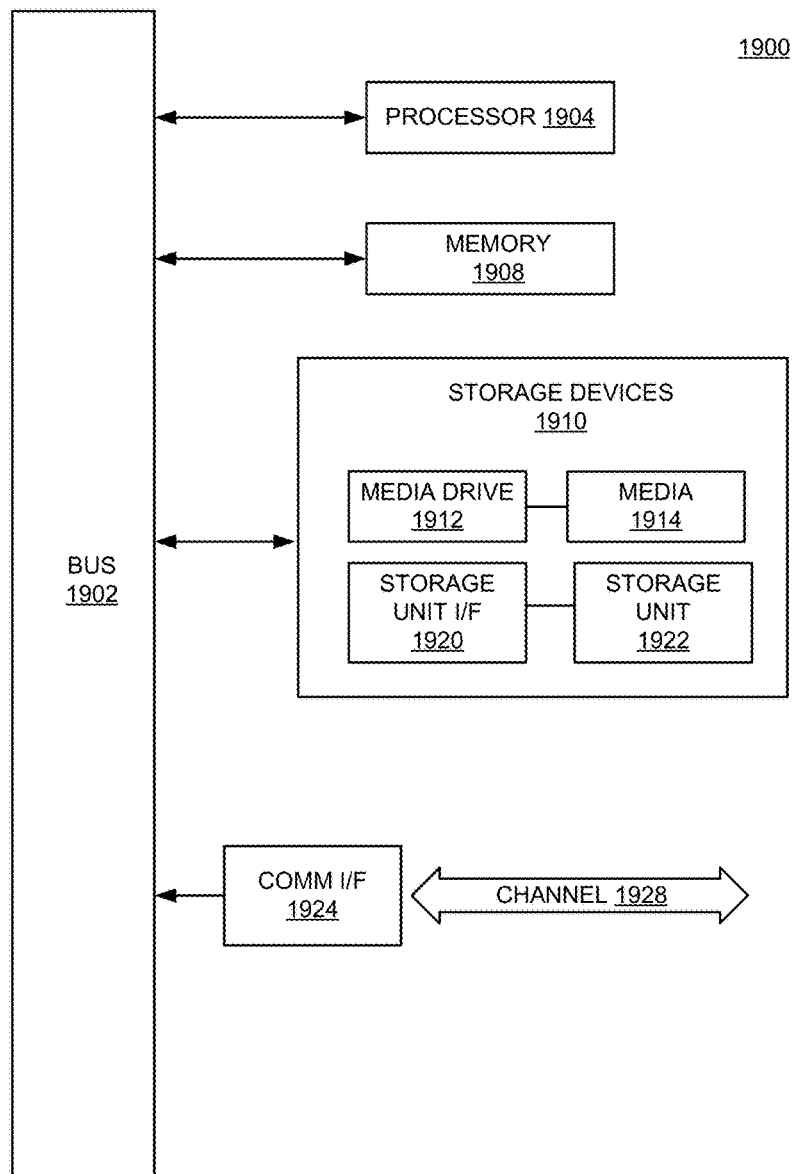
FIG. 19 illustrates an example computing module that may be used in implementing various features of embodiments of the disclosed technology.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where circuits are implemented in whole or in part using software, in one embodiment, these software elements can be implemented to operate with a computing or processing system capable of carrying out the functionality described with respect thereto. One such example computing system is shown in FIG. 19. Various embodiments are described in terms of this example-computing system 1900. After reading this description, it will become apparent to a person skilled in the relevant art how to implement the technology using other computing systems or architectures.

Referring now to FIG. 19, computing system 1900 may represent, for example, computing or processing capabilities found within desktop, laptop and notebook computers; hand-held computing devices (smart phones, cell phones, palmtops, tablets, etc.); mainframes, supercomputers, workstations or servers; or any other type of special-purpose or general-purpose computing devices as may be desirable or appropriate for a given application or environment. Computing system 1900 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 1900 might include, for example, one or more processors, controllers, control modules, or other processing devices, such as a processor 1904. Processor 1904 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 1904 is connected to a bus 1902, although any communication medium can be used to facilitate interaction with other components of computing system 1900 or to communicate externally.

Computing system 1900 might also include one or more memory modules, simply referred to herein as main memory 1908. For example, in some embodiments random access memory (RAM) or other dynamic memory, might be used for storing information and instructions to be executed by processor 1904. Main memory 1908 might also be used for storing temporary variables or other intermediate information during execution of instructions to be executed by processor 1904. Computing system 1900 might likewise include a read only memory ("ROM") or other static storage device coupled to bus 1902 for storing static information and instructions for processor 1904.

The computing system 1900 might also include one or more various forms of information storage mechanism 1910, which might include, for example, a media drive 1912 and a storage unit interface 1920. The media drive 1912 might include a drive or other mechanism to support fixed or removable storage media 1914. For example, a hard disk drive, a floppy disk drive, a magnetic tape drive, an optical disk drive, a CD or DVD drive (R or RW), a flash drive, or other removable or fixed media drive might be provided. Accordingly, storage media 1914 might include, for example, a hard disk, a floppy disk, magnetic tape, cartridge, optical disk, a CD or DVD, or other fixed or removable medium that is read by, written to or accessed by media drive 1912. As these examples illustrate, the storage media 1914 can include a computer usable storage medium having stored therein computer software or data.

In alternative embodiments, information storage mechanism 1910 might include other similar instrumentalities for allowing computer programs or other instructions or data to be loaded into computing system 1900. Such instrumentalities might include, for example, a fixed or removable storage unit 1922 and an interface 1920. Examples of such storage units 1922 and interfaces 1920 can include a program cartridge and cartridge interface, a removable memory (for example, a flash memory or other removable memory module) and memory slot, a flash drive and associated slot (for example, a USB drive), a PCMCIA slot and card, and other fixed or removable storage units 1922 and interfaces 1920 that allow software and data to be transferred from the storage unit 1922 to computing system 1900.

Computing system 1900 might also include a communications interface 1924. Communications interface 1924 might be used to allow software and data to be transferred between computing system 1900 and external devices. Examples of communications interface 1924 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 1924 might typically be carried on signals, which can be electronic, electromagnetic (which includes optical) or other signals capable of being exchanged by a given communications interface 1924. These signals might be provided to communications interface 1924 via a channel 1928. This channel 1928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1908, storage unit 1920, media 1914, and channel 1928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 1900 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A process for signal precoding in a frequency-reuse satellite communication system comprising a plurality of beams transmitting from a satellite to a plurality of cells, the process comprising:
   determining a first antenna pattern for a beam directed from a first antenna feed on the satellite toward a first cell and determining a second antenna pattern for a beam directed from a second antenna feed on the satellite toward a second cell adjacent to the first cell; wherein the first and second adjacent cells are partitioned into a plurality of sectors;
   determining a first sector location of a first user terminal in the first cell and a second sector location of a second user terminal in the second cell;
   determining gains of the first antenna pattern toward the first and second sector locations;
   determining gains of the second antenna pattern towards the first and second sector locations;
   a precoder matrix circuit using the determined first and second antenna pattern gains to calculate a precoder matrix to reduce interference levels caused by the first signal at the second sector of the second cell and by the second signal at the first sector of the first cell; and
   the precoder matrix circuit applying the precoder matrix to the first and second signals to at least partially cancel interference caused by the first signal at the second sector and to at least partially cancel interference caused by the second signal at the first sector.

2. The process of claim 1, wherein the precoder matrix is calculated using the first and second antenna pattern gains for the first and second sector locations, independent of the location of first and second user terminals within their respective first and second sectors.

3. The process of claim 1, wherein calculating a precoder matrix comprises precomputing a set of precoder matrices for all possible combinations of sectors in adjacent halves of the adjacent cells, and selecting the precoder matrix corresponding to the first and second sectors from the precomputed set of precoder matrices.

4. The process of claim 1, wherein a sector location for a given sector is a geographic center of that sector.

5. The process of claim 1, wherein a sector location for a given sector is the location of the centroid of the distribution of user terminals within that sector or the location that results in beam shapes that result in the highest average throughput for the user terminals in the sector.

6. The process of claim 1, further comprising the satellite transmitting the first and second signals from the first and second antenna feeds, respectively, via a user downlink to the first and second user terminals, and wherein the first user terminal receives a sum of the first signal and the second signal.

7. The process of claim 1, wherein the first and second adjacent cells are further partitioned into half cells, the process further comprising:
   determining a destination half-cell of a packet of the first signal;
   if the packet of the first signal is destined for the first half-cell of the first cell, transmitting the first packet;
   if the packet of the first signal is destined for the second half-cell of the first cell, determining a distance between the destination sector of the packet in the first signal and the destination sector of the packet in the second signal, and if the determined distance is greater than a determined threshold, transmitting the packet, but if the determined distance is not greater than the determined threshold, not transmitting the packet of the first signal.

8. The process of claim 7, further comprising if the determined distance is not greater than the determined threshold, repeating the process of claim 7, for another packet of the first signal.

9. The process of claim 1, further comprising controlling transmissions between the beam transmitting the first signal and the beam transmitting the second signal such that if one of the beams is transmitting to a sector on the edge of its corresponding cell, the other beam is only permitted to transmit to an interior sector of its corresponding cell.

10. The process of claim 1, wherein a coverage area of the satellite comprises a plurality of cells arranged in a pattern and the cells are each divided into a plurality of sectors, the process further comprising;
    selecting a candidate packet from all cells in the pattern to create a vector of destination sectors that may be used for a group of packets;
    calculating a distance between a sector of the candidate packet and a sector of a packet for a beam of an adjacent cell;
    determining whether the calculated distance is greater than a predetermined minimum distance between the destination sectors and if so, tagging the candidate packet for transmission; and
    repeating the selecting, calculating and distance determining operations for cell pairs in the plurality of sectors.

11. The process of claim 1, wherein the first and second adjacent cells are partitioned into first and second half-cells, the adjacent cells are further partitioned into a plurality of sectors, and wherein the process further comprises scheduling transmissions of the first and second signals such that the first and second signals are transmitted to first and second sectors, respectively, having a predetermined minimum separation distance.

12. The process of claim 11, wherein each cell is partitioned into six sectors, and wherein the scheduling of transmission comprises allowing the second signals to be transmitted to sectors in one half of the second cell when the first signals are being transmitted to sectors in an adjacent half of the second cell according to the following constraint:

|  |  | IF FIRST SIGNALS ARE BEING TRANSMITTED TO: | | |
| --- | --- | --- | --- | --- |
|  |  | 4 | 5 | 6 |
| SECOND SIGNALS CAN BE TRANSMITTED TO: | 1 | YES | NO | NO |
|  | 2 | YES | YES | NO |
|  | 3 | YES | YES | YES. |

13. The process of claim 11, wherein each half-cell is partitioned into six sectors, and wherein the scheduling of transmission comprises allowing the second signals to be transmitted to sectors in one half of the second cell when the first signals are being transmitted to sectors in an adjacent half of the second cell according to the following constraint:

|  |  | IF FIRST SIGNALS ARE BEING TRANSMITTED TO: | | | | | |
| --- | --- | --- | --- | --- | --- | --- | --- |
|  |  | 7 | 8 | 9 | 10 | 11 | 12 |
| SECOND SIGNALS CAN BE TRANSMITTED TO: | 1 | YES | YES | NO | NO | NO | NO |
|  | 2 | YES | YES | YES | NO | NO | NO |
|  | 3 | YES | YES | YES | YES | NO | NO |
|  | 4 | YES | YES | YES | YES | YES | NO |
|  | 5 | YES | YES | YES | YES | YES | YES |
|  | 6 | YES | YES | YES | YES | YES | YES. |

14. The process of claim 1, wherein determining and applying the precoder matrix are performed by a satellite gateway or by the satellite.

15. The process of claim 1, further comprising correcting for differential phase or amplitude errors due to a feeder uplink or satellite transponder using a calibration process to factor out the errors.

16. The process of claim 1, wherein the satellite communication system comprises an antenna with a single feed per beam (SFPB) for user links and wherein a number of adjacent mutually interfering cells are served from the same gateway.

17. The process of claim 16, wherein the precoder matrix circuit operations are performed by the gateway.

18. The process of claim 1, wherein the precoder matrix comprises at least one of a direct matrix inversion (DMI), zero-forcing (ZF), and regularized zero-forcing (RZF) (also known as minimum mean squared error or MMSE) precoding.

19. A system for implementing frequency-reuse in a satellite communication system, comprising:
a communication gateway comprising inputs coupled to receive user streams;
a satellite communicatively coupled to the gateway, the satellite comprising a plurality of feeds, wherein a first feed transmits a first user signal in a first beam to a first user terminal in a first sector of a first cell, and a second feed transmits a second user signal in a second beam to a second user terminal in a second sector in a second cell adjacent the first cell; and
a precoder circuit, comprising
a plurality of input receiver circuits coupled to receive user data streams including first and second user signals; and
a precoder computation circuit coupled to receive the first and second user signals and comprising a processor to determine a first sector location of the first user terminal in the first cell and a second sector location of the second user terminal in the second cell, and to compute a precoder matrix that when applied to at least one of the first and second user signals reduces interference caused by the second signal at the first user terminal, wherein the precoder computation circuit computes the precoder matrix using antenna pattern gains for the first and second beams relative to respective sector locations of the first and second sectors.

20. The system of claim 19, wherein the precoder computation circuit computes the precoder matrix using the antenna pattern gains for the first and second sector locations, independent of the location of first and second user terminals within their respective first and second sectors.

21. The system of claim 19, wherein computing a precoder matrix comprises precomputing a set of precoder matrices for all possible combinations of sectors in adjacent halves of the adjacent cells, and selecting the precoder matrix corresponding to the first and second sectors from the precomputed set of precoder matrices.

22. The system of claim 20, wherein a sector location for a given sector is a geographic center of that sector.

23. The system of claim 20, wherein a sector location for a given sector is the location of the centroid of the distribution of user terminals within that sector or the location that results in beam shapes that result in the highest average throughput for the user terminals in the sector.

24. The system of claim 19, wherein the first and second adjacent cells are partitioned into first and second half-cells, a destination of a packet of the first signal is a sector in the first cell, and a destination of a packet in the second signal is a sector in the second cell, and wherein the system further comprises a scheduling circuit comprising a processor and instructions stored in non-transitive memory, the instructions configured to perform the operations of determining a destination half-cell of a the packet of the first signal; if the packet of the first signal is destined for the first half-cell of the first cell, transmitting the first packet; if the packet of the first signal is destined for the second half-cell of the first cell, determining a distance between the destination sector of the packet in the first signal and the destination sector of the packet in the second signal, and if the determined distance is greater than a determined threshold, transmitting the packet, but if the determined distance is not greater than the determined threshold, not transmitting the packet of the first signal.

25. The system of claim 24, wherein the instructions are further configured to perform the operation of: if the determined distance is not greater than the determined threshold, repeating the operations of claim 24, for another packet of the first signal.

26. The system of claim 24, wherein the instructions are further configured to perform the operation of controlling transmissions between the beam transmitting the first signal and the beam transmitting the second signal such that if one of the beams is transmitting to a sector on the edge of its corresponding cell, the other beam is only permitted to transmit to and interior sector of its corresponding cell.

27. The system of claim 24, wherein a coverage area of the satellite comprises a plurality of cells arranged in a pattern and the cells are each divided into a plurality of sectors, and wherein the instructions are further configured to perform the operations of:
- selecting a candidate packet from all cells in the pattern to create a vector of sectors that may be used in a superframe;
- calculating a distance between a sector of the candidate packet and a sector of a packet for a beam of an adjacent cell;
- determining whether the calculated distance is greater than a predetermined minimum distance between the destination sectors and if so, tagging the candidate packet for transmission; and
- repeating the selecting, calculating and distance determining operations for cell pairs in the plurality of sectors.

28. The system of claim 24, wherein the first and second adjacent cells are partitioned into first and second half-cells, the adjacent cells are further partitioned into a plurality of sectors, and wherein the instructions are further configured to perform the operation of scheduling transmissions of the first and second signals such that the first and second signals are transmitted to first and second sectors, respectively, having a predetermined minimum separation distance.

29. The system of claim 28, wherein each cell is partitioned into six sectors, and wherein the scheduling of transmission comprises allowing the second signals to be transmitted to sectors in one half of the second cell when the first signals are being transmitted to sectors in an adjacent half of the second cell according to the following constraint:

|  |  | IF FIRST SIGNALS ARE BEING TRANSMITTED TO: | | |
|---|---|---|---|---|
|  |  | 4 | 5 | 6 |
| SECOND SIGNALS CAN BE TRANSMITTED TO: | 1 | YES | NO | NO |
|  | 2 | YES | YES | NO |
|  | 3 | YES | YES | YES. |

30. The system of claim 28, wherein each half-cell is partitioned into six sectors, and wherein the scheduling of transmission comprises allowing the second signals to be transmitted to sectors in one half of the second cell when the first signals are being transmitted to sectors in an adjacent half of the second cell according to the following constraint:

|  |  | IF FIRST SIGNALS ARE BEING TRANSMITTED TO: | | | | | |
|---|---|---|---|---|---|---|---|
|  |  | 7 | 8 | 9 | 10 | 11 | 12 |
| SECOND SIGNALS CAN BE TRANSMITTED TO: | 1 | YES | YES | NO | NO | NO | NO |
|  | 2 | YES | YES | YES | NO | NO | NO |
|  | 3 | YES | YES | YES | YES | NO | NO |
|  | 4 | YES | YES | YES | YES | YES | NO |
|  | 5 | YES | YES | YES | YES | YES | YES |
|  | 6 | YES | YES | YES | YES | YES | YES. |

\* \* \* \* \*